United States Patent
Ellzey et al.

(10) Patent No.: US 10,442,521 B1
(45) Date of Patent: Oct. 15, 2019

(54) APPARATUS FOR RETAINING AND DEPLOYING A WING OF AN AERIAL VEHICLE

(71) Applicant: LOCKHEED MARTIN CORPORATION, Bethesda, MD (US)

(72) Inventors: Steven J. Ellzey, Grand Prairie, TX (US); James C. Copp, Arlington, TX (US); Gregory M. Richards, Colleyville, TX (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 481 days.

(21) Appl. No.: 15/388,560

(22) Filed: Dec. 22, 2016

Related U.S. Application Data

(63) Continuation-in-part of application No. 15/014,399, filed on Feb. 3, 2016, now Pat. No. 10,124,880.

(51) Int. Cl.
   *B64C 3/56* (2006.01)
   *B64C 5/12* (2006.01)
   *B64C 39/02* (2006.01)

(52) U.S. Cl.
   CPC ............ *B64C 3/56* (2013.01); *B64C 5/12* (2013.01); *B64C 39/024* (2013.01); *B64C 2201/102* (2013.01)

(58) Field of Classification Search
   CPC .... B64C 3/56; B64C 5/12; B64C 5/16; B64C 39/024; B64C 2201/102
   See application file for complete search history.

(56) References Cited

U.S. PATENT DOCUMENTS

| | | | | |
|---|---|---|---|---|
| 5,615,847 A | * | 4/1997 | Bourlett | F42B 10/14 114/316 |
| 6,056,237 A | * | 5/2000 | Woodland | B64C 3/40 244/3.15 |
| 6,923,404 B1 | * | 8/2005 | Liu | B64C 3/40 244/46 |
| 8,584,984 B2 | * | 11/2013 | Parks | B64C 3/56 244/123.11 |

(Continued)

OTHER PUBLICATIONS

Author Unknown, "Suicide Bdyat: Development Trends Loitering Munitions. Part 2," topwar.ru, xn---- ctbjbare5aadbdikvl8n.xn--p1ai/tehnika-i-vooruzhenie/184538-samoubijci-bdyat-napravleniya-razvitiya-barrazhiruyushih-boepripasov-chast-2_93368.html, 2012, military pensioners, pp. 1-11.

*Primary Examiner* — Marc Burgess
(74) *Attorney, Agent, or Firm* — Terry M. Sanks, Esq.; Beusse Wolter Sanks & Maire, PLLC

(57) ABSTRACT

An apparatus, having: a fuselage body section (180) configured to be secured to an aircraft fuselage (16); a pivot column (310) protruding from the fuselage body section; and a center wing section (214) configured to be secured to a center wing panel of a trifold wing (200). The fuselage body section and the center wing section are configured to cooperate with each other to rotate the center wing section relative to the fuselage body section from a stowed position (250) to a deployed position (302). The pivot column comprises a column feature (240) configured to engage with tip features (236) of the trifold wing to hold the trifold wing in a folded configuration when the trifold wing is in the stowed position and to disengage from the tip features as the trifold wing rotates to the deployed position, thereby freeing the trifold wing to unfold.

19 Claims, 27 Drawing Sheets

(56) References Cited

U.S. PATENT DOCUMENTS

| | | | | |
|---|---|---|---|---|
| 8,876,039 | B2* | 11/2014 | Lubenow | B64C 39/024 |
| | | | | 244/3.28 |
| 9,452,820 | B1* | 9/2016 | Wirth | B64C 3/56 |
| 9,789,950 | B1* | 10/2017 | Most | B64C 3/56 |
| 2012/0280080 | A1 | 11/2012 | Lubenow et al. | |
| 2016/0176503 | A1* | 6/2016 | Gettinger | B64C 39/024 |
| | | | | 244/3.27 |
| 2017/0369150 | A1* | 12/2017 | Finklea | B64C 3/56 |

* cited by examiner

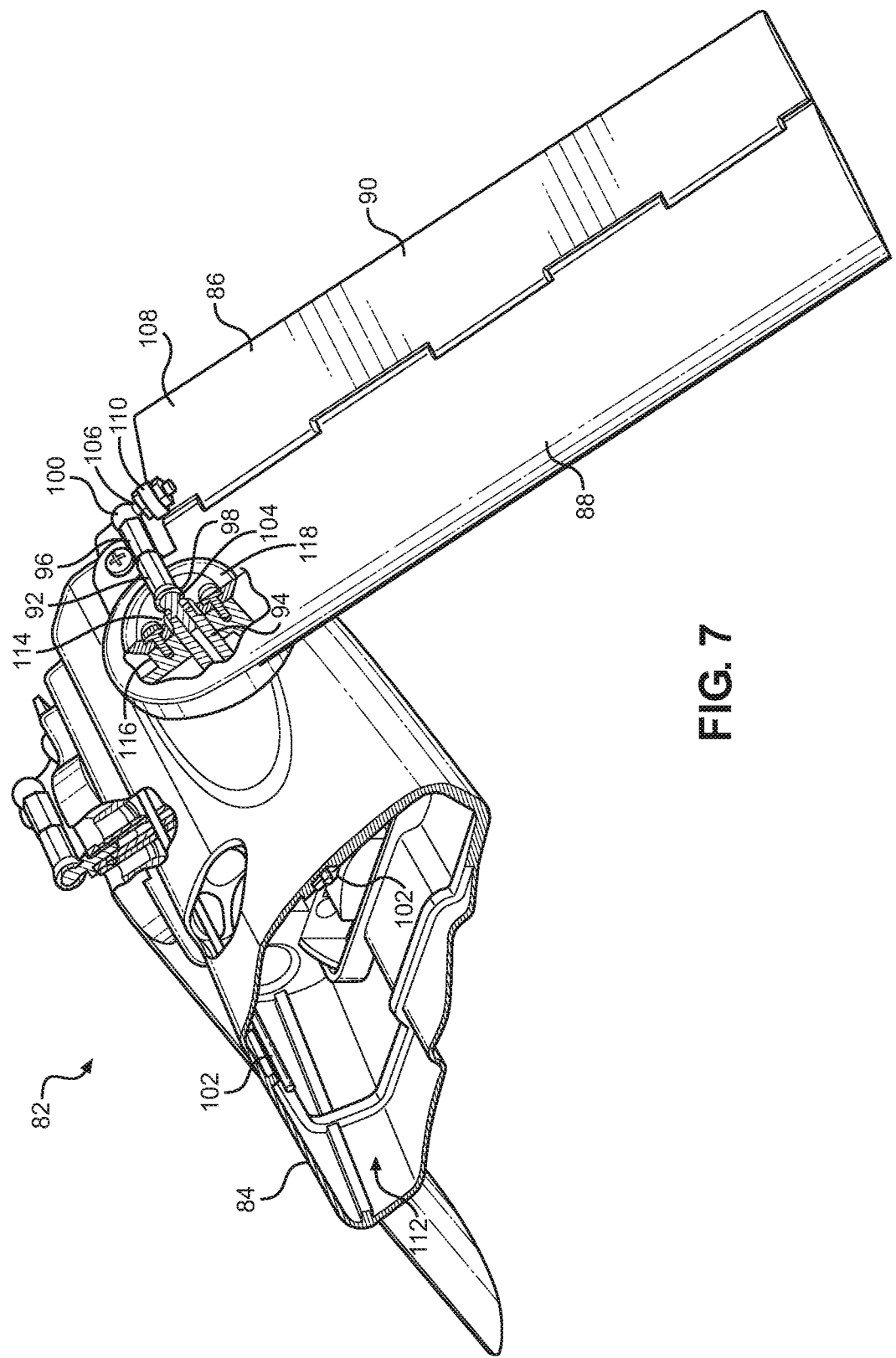

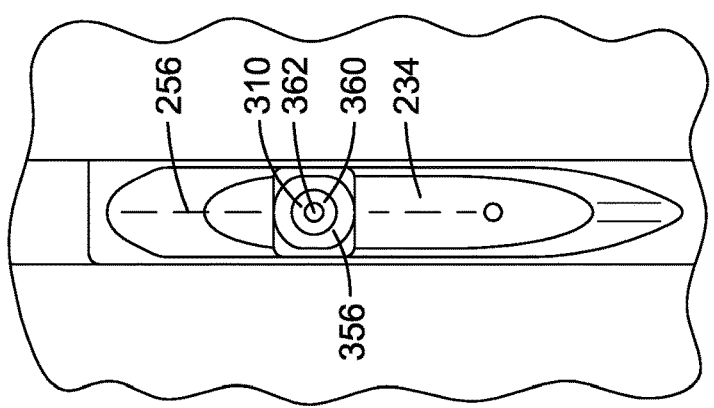
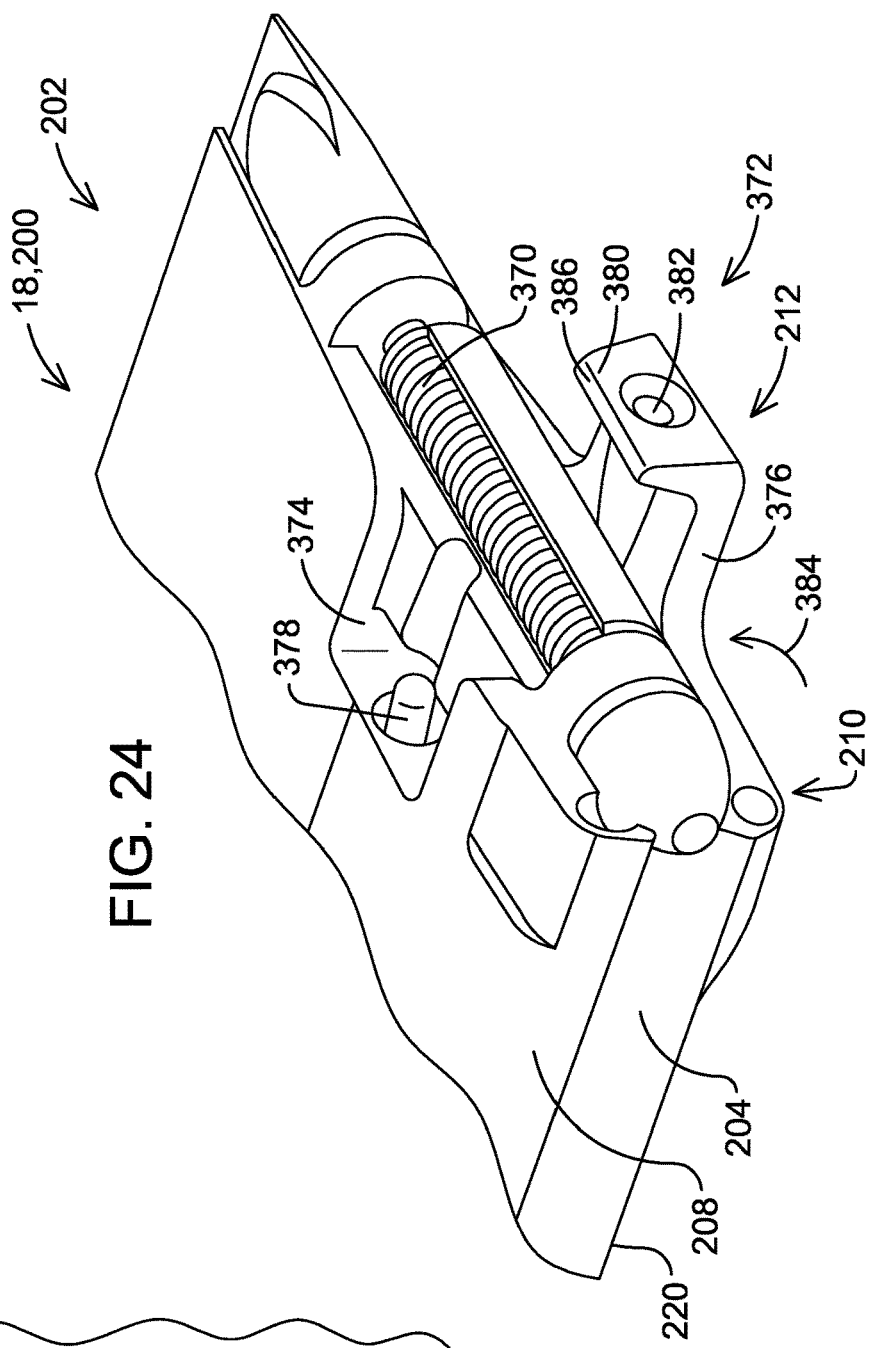
FIG. 23
FIG. 24

APPARATUS FOR RETAINING AND DEPLOYING A WING OF AN AERIAL VEHICLE

CROSS-REFERENCE TO RELATED APPLICATIONS

This application is a continuation-in-part of U.S. patent application Ser. No. 15/014,399, filed Feb. 3, 2016, titled "ROTATABLE CONTROL SURFACE ASSEMBLY FOR AN UNMANNED AERIAL VEHICLE," assigned to Lockheed Martin Corporation, and incorporated herein by reference as if set forth in full below.

TECHNICAL FIELD

The field of the disclosure relates to an aircraft, such as an unmanned aerial vehicle (UAV), and in particular to a control surface assembly that allows a control surface member to rotate with respect to a fuselage of the UAV.

BACKGROUND

Unmanned aerial vehicles (UAVs) are aircraft that are capable of flight without an onboard pilot. UAVs may be capable of autonomous flight, and may also be capable of being controlled by a remotely located human pilot. As a result, UAVs can be made smaller and more portable than manned aircraft. However, many UAVs require a plurality of fins with control surfaces, such as wings, rudders, and/or tailfins, to operate properly, which complicates storage and portability of the UAV. Accordingly, there is a need for a UAV with fins that can be quickly and reliably converted back and forth between a stowed configuration and a deployed configuration without interfering with the operation of the UAV.

SUMMARY

According to one embodiment, an apparatus of an aerial vehicle is disclosed. The apparatus includes a fuselage body section configured to be secured to an aircraft fuselage; a pivot column protruding from the fuselage body section; and a center wing section configured to be secured to a center wing panel of a trifold wing. The fuselage body section and the center wing section are configured to cooperate with each other to rotate the center wing section relative to the fuselage body section from a stowed position to a deployed position. The pivot column comprises a column feature configured to engage with tip features of the trifold wing to hold the trifold wing in a folded configuration when the trifold wing is in the stowed position and to disengage from the tip features as the trifold wing rotates to the deployed position, thereby freeing the trifold wing to unfold.

According to another embodiment, an apparatus of an aerial vehicle is disclosed. The apparatus includes: a fuselage; a trifold wing comprising a port wing panel, a starboard wing panel, and a center wing panel there between; a joint arrangement configured to secure the center wing panel to the fuselage and permit the trifold wing to rotate from a stowed position to a deployed position; and a pivot column secured to the fuselage and configured to secure the port and starboard wing panels of the trifold wing in a folded configuration when the trifold wing is in the stowed position and to release from the port and starboard wing panels as the trifold wing rotates away from the stowed position.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 7 illustrates a partial cutaway view of a UAV according to an alternate embodiment, with portions of a control surface linkage disposed outside the fuselage of the UAV.

FIG. 23 illustrates a close-up view of the pylon of FIG. 22.

FIG. 24 illustrates a perspective view of an example embodiment of a wing joint in a folded configuration.

DETAILED DESCRIPTION

Figure 1B:
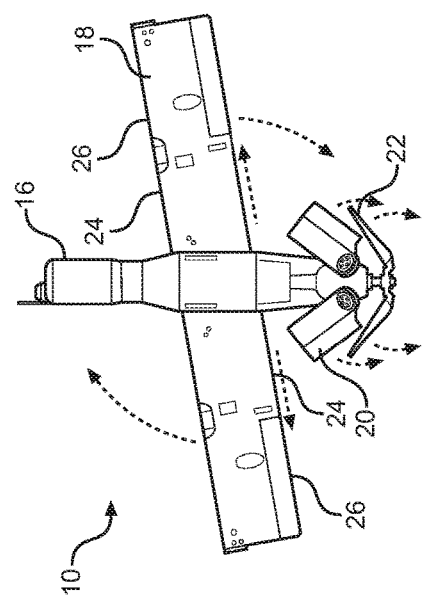
FIGS. 1A-1C illustrate an unmanned aerial vehicle (UAV) according to an embodiment being launched from a storage and launch tube, with the UAV converting from a stowed configuration to a deployed configuration during launch.

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first end" and "second end," and does not imply a priority, a type, an importance, or other attribute, unless otherwise stated herein. The term "substantially" used herein in conjunction with a numeric value means any value that is within a range of five percent greater than or five percent less than the numeric value. The term "substantially" used herein in conjunction with an angular definition means any value that is within a range of five degrees greater than or five degrees less than the angular relationship.

Embodiments include a control surface assembly for an unmanned aerial vehicle (UAV) or a manned aerial vehicle. The control surface assembly comprises a fin configured to be rotatably coupled to a fuselage of the UAV, with a control surface member rotatably coupled to the fin. A control surface linkage is configured to be coupled between the control surface member and an actuator disposed in the fuselage. The fin is rotatable with respect to the fuselage between a stowed configuration, in which the UAV is prepared for storage, and a deployed configuration, in which the UAV is capable of flight. In the deployed configuration, the control surface linkage is configured to rotate the control surface member with respect to the fin when the actuator actuates the control surface linkage. In the stowed configuration, however, the control surface linkage is configured to move with respect to the fin without rotating the control surface member, when the actuator actuates the control surface linkage.

One advantage of disposing the actuator in the fuselage is that actuators may contain relatively heavy components, such as a motor, for example, that can interfere with the desired weight distribution of the UAV. For example, disposing the actuator on or in the rotatable fin itself can interfere with the aerodynamic characteristics, and can also make the UAV "tail-heavy" when disposed on or in a rearwardly disposed fin, such as a tailfin or rudder. For many UAV designs, it is more desirable to locate the heavier actuator components inside the fuselage in a forward location for optimal weight distribution.

This arrangement requires a mechanical linkage between the actuator and the control surface, but this presents difficulties when the fin is movable with respect to the fuselage. The mechanical linkage must be capable of moving the control surface when the fin is deployed, and the linkage must also be arranged so that actuating the linkage when the fin is deployed does not damage or stress the linkage or fin when the fin is stowed. One advantage of embodiments described herein is that a control surface linkage can operate the control surface in the deployed configuration and can also be actuated in the stowed configuration without damaging or stressing the control surface linkage or fin.

Figure 1C:
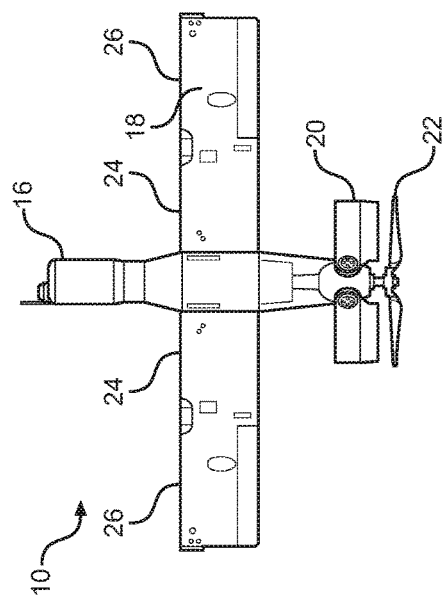
Figure 1A:
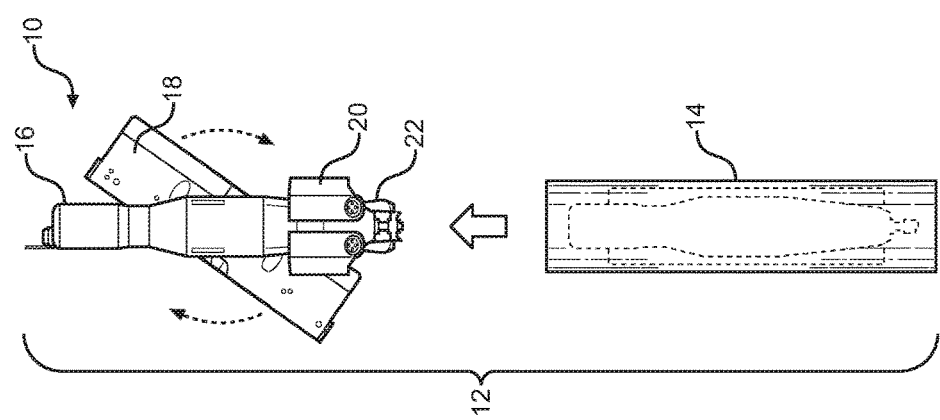

Before discussing the details of an example control surface linkage, a UAV 10 having a deployed and stowed configuration according to an embodiment is described in relation to FIGS. 1A-1C. The UAV 10 is part of a portable launch system 12 that also comprises a storage and launch tube 14. In this embodiment, the UAV 10 has a fuselage 16 sized to be stored in an interior of the storage and launch tube 14. The UAV 10 includes a wing sub-assembly 18, a pair of tail fin sub-assemblies 20, and a propeller 22, each of which is movable back and forth between the deployed and stowed configuration. In the stowed configuration of this embodiment, the wing sub-assembly 18 is folded and rotated, the tail fin sub-assemblies 20 are rotated, and the propeller 22 is folded so that the UAV 10 can be compactly stored in the storage and launch tube 14. In this embodiment, as shown in FIG. 1A, the storage and launch tube 14 may contain a launch mechanism that launches the UAV 10 out of the storage and launch tube 14. As the UAV 10 exits the storage and launch tube 14, FIGS. 1B and 1C illustrate the wing sub-assembly 18, the tail fin sub-assemblies 20 and the propeller 22 automatically rotating and/or folding into the deployed configuration. For example, a wing body 24 of the wing sub-assembly 18 automatically rotates with respect to the fuselage 16, the wing extension members 26 automatically unfold into place, and the propeller 22 also unfolds away from the fuselage into place. Each tail fin sub-assembly 20 is also configured to automatically rotate with respect to the fuselage 16 when the UAV 10 is launched from the storage and launch tube 14. In this manner, the UAV 10 can convert itself from the stowed configuration to the deployed configuration within seconds of being launched from the storage and launch tube 14.

Figure 2A:
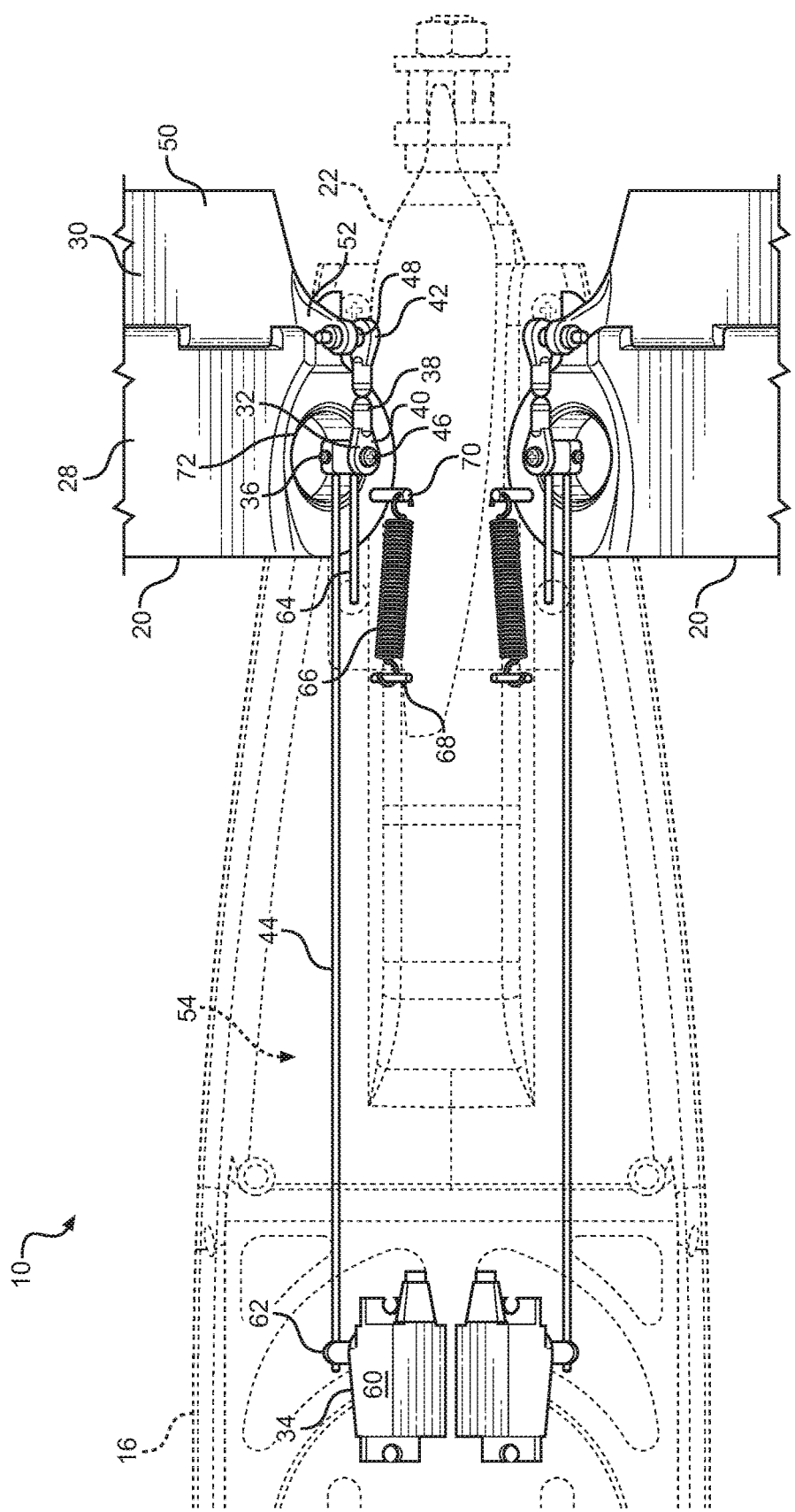
FIGS. 2A-2C illustrate internal components of the UAV of FIGS. 1A-1C in the deployed configuration, to illustrate operation of tail fin sub-assemblies of the UAV when deployed.
Figure 2B:
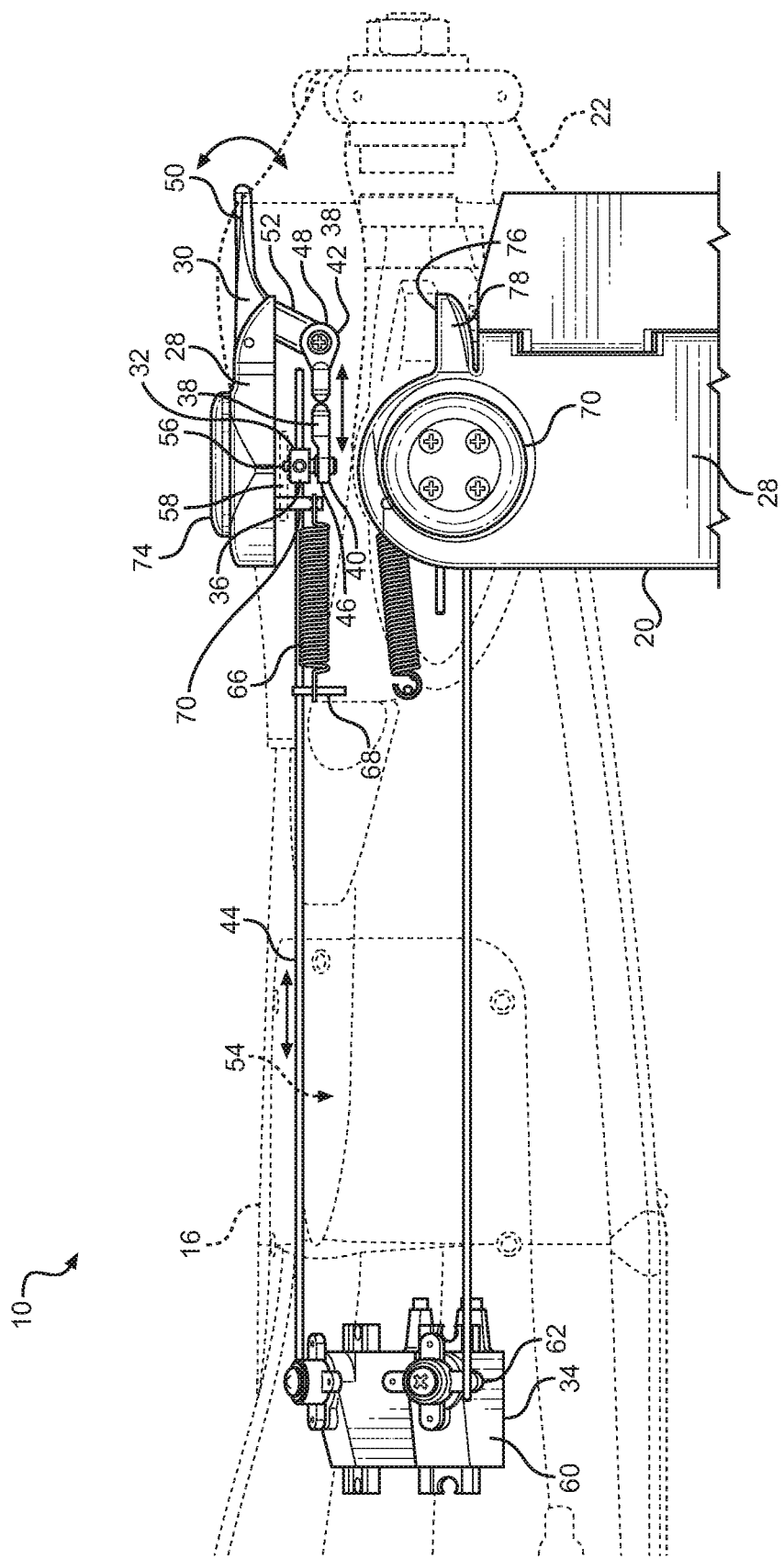
Figure 2C:
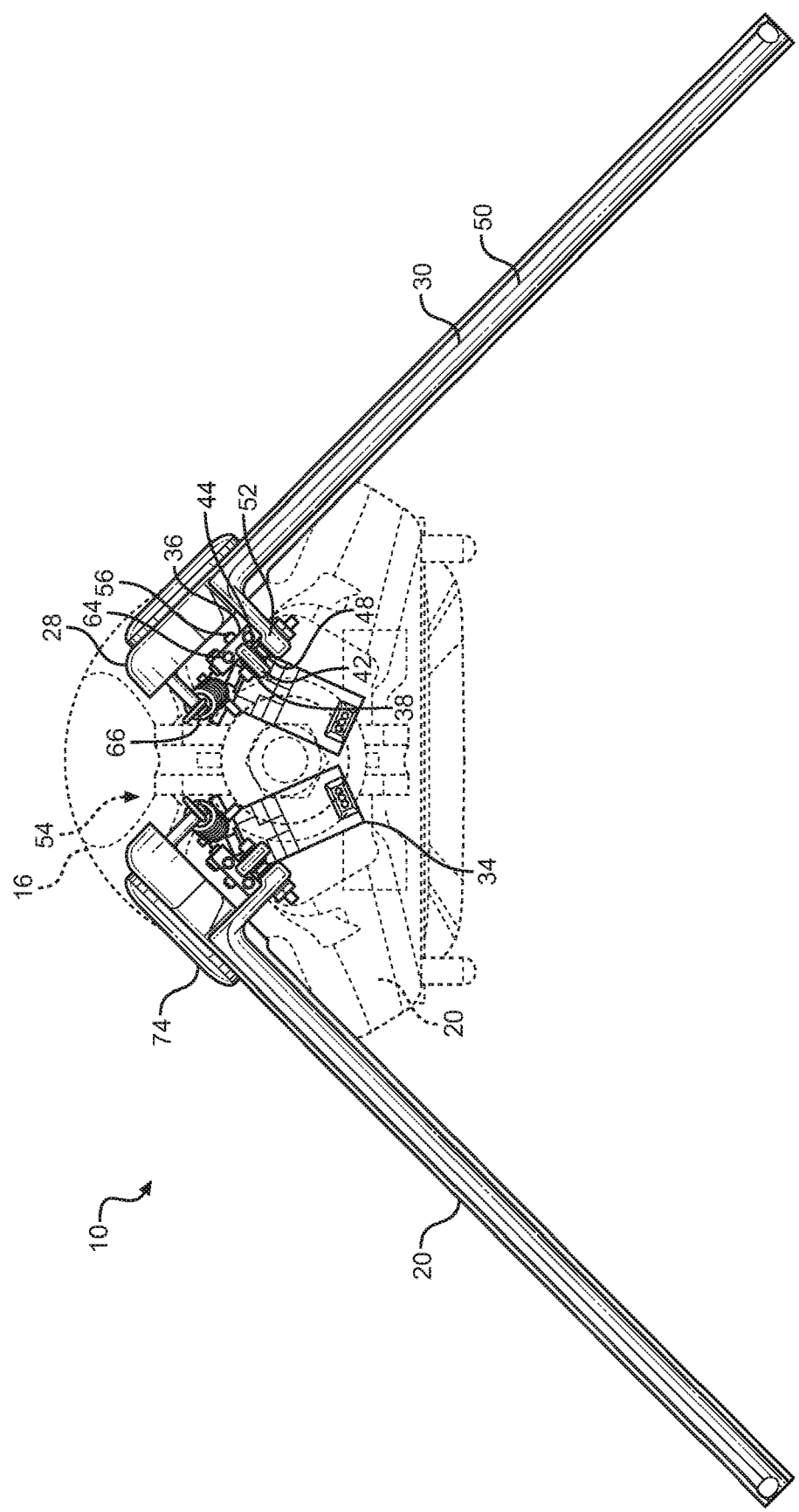

As discussed above, it is desirable to locate the heavier components within the fuselage 16, but this makes it difficult to mechanically control the movable elements located in the wing sub-assembly 18 and particularly in the tail fin sub-assemblies 20. In this regard, FIGS. 2A-2C illustrate internal components of the UAV 10 in the deployed configuration, to illustrate operation of the tail fin sub-assemblies 20 during flight. In particular, FIG. 2A is a bottom cutaway view, FIG. 2B is a top cutaway view at a 45-degree offset, and FIG. 2C is a rear cutaway view of the UAV 10. As shown by FIGS. 2A-2C, each tail fin sub-assembly 20 includes a fin 28 that is rotatably coupled to the fuselage 16, which allows the tail fin sub-assembly 20 to rotate back and forth between the deployed and stowed configuration. Each fin 28 has a control surface member 30 rotatably coupled thereto. In this embodiment, as shown by FIG. 2B, the tail fin sub-assembly 20 is arranged at a 45-degree downward angle with respect to the fuselage 16. This type of tail fin sub-assembly 20 is commonly called a ruddervator, because its control surface member 30 functions as a rudder and an elevator simultaneously. It should be understood, however, that aspects of the disclosed embodiments are equally applicable to other types of fins, such as, for example, a wing, a tailfin, rudder, etc.

In this embodiment, each tail fin sub-assembly 20 includes a control surface linkage 32 coupled between the control surface member 30 and an actuator 34 disposed in the fuselage 16. The control surface linkage 32 is configured to be actuated by the actuator 34 to rotate the control surface member 30 with respect to the fin 28. The control surface linkage 32 includes a translation member 36 configured to translate in a longitudinal direction with respect to the fuselage 16. A control link 38 is coupled between the translation member 36 at a first end 40 and the control surface 30 at a second end 42. In this embodiment, a pushrod 44 is connected between the translation member 36 and a respective actuator 34. The pushrod 44 extends substantially in the longitudinal direction and is fixed with respect to the translation member 36, such that actuating the actuator 34 moves the pushrod 44 and the translation member 36 in the longitudinal direction.

The first end 40 and the second end 42 of the control link 38 include a respective first ball link 46 coupled to the translation member 36 and second ball link 48 coupled to the control surface member 30. The first ball link 46 allows the control link 38 to rotate with respect to the translation member 36 with three degrees of freedom and the second ball link 48 permits the control link 38 to rotate with respect to the control surface member 30 with three degrees of freedom as well. In this embodiment, when the tail fin sub-assembly 20 and the control surface linkage 32 are in the deployed configuration, the control link 38 is substantially parallel to the longitudinal direction, and is aligned with the pushrod 44 and the translation member 36. As a result, actuating the actuator 34 causes the pushrod 44, the translation member 36, and the control link 38 to all move in the longitudinal direction in unison.

As discussed above, the second end 42 of the control link 38 is rotatably coupled to the control surface member 30 via the second ball link 48. The control surface member 30 includes a control surface 50 that is rotatable with respect to the fin 28, and an arm 52 that is fixed with respect to the control surface 50. The second ball link 48 of the control link 38 is rotatably coupled to the arm 52 such that moving the control link 38 in the longitudinal direction causes the arm 52 to rotate the control surface 50 with respect to the fin 28 about an axis substantially parallel to the fin 28 when the fin 28 is in the deployed configuration. As a result, when the fin 28 is in the deployed configuration, the actuator 34 is able to move the pushrod 44, the translation member 36, and the control link 38 in unison in the longitudinal direction to cause the arm 52 to rotate the control surface 50 with respect to the fin 28. In this embodiment, moving the pushrod 44, the translation member 36, and the control link 38 forward with respect to the fuselage 16 causes the control surface 30 to rotate down with respect to the fin 28, and moving the pushrod 44, the translation member 36, and the control link 38 rearward with respect to the fuselage 16 causes the control surface 30 to rotate up with respect to the fin 28. It should be understood, however, that other functional arrangements are contemplated.

In this manner, the actuator 34 can be disposed in an interior 54 of the fuselage 16 while retaining the ability to control the control surface member 30 of the rotatable fin 28. The actuator 34 includes a motor 60, such as a servo or a stepper motor for example, and a rotatable actuator arm 62 connected to the pushrod 44. As the actuator arm 62 rotates, the pushrod 44 moves forward or rearward substantially in the longitudinal direction, thereby moving the translation member 36 in the longitudinal direction as well. In this embodiment, the translation member 36 includes a protrusion 56 that slidably engages a slot 58 (See FIG. 2B) disposed in the interior of the fuselage 54. The translation member 36 is also slidably mounted about a guide rod 64 that extends parallel to the slot 58 and is fixed with respect to the fuselage 16. The slot 58 and the guide rod 64 both extend in the longitudinal direction and cause the translation member 36 to translate substantially in the longitudinal direction along the slot 58 when the actuator 34 actuates the pushrod 44 forward or rearward.

During operation of the UAV 10, each tail fin sub-assembly 20 is biased toward the deployed configuration by a respective tension spring 66. Each spring 66 is connected between a fuselage 16 spring pin 68 fixed to the interior 54 of the fuselage 16 and a fin spring pin 70 fixed to the fin 28. In this embodiment, the fin 28 has a circular recess 72 formed therein which matingly engages a gasket 74 coupled to the fuselage 16. The gasket 74 retains the fin 28 with respect to the fuselage 16 while permitting the fin 28 to rotate with respect to the fuselage 16 between the stowed and deployed configurations. In this embodiment, the fuselage 16 has a pair of fuselage stops 76 configured to engage and retain a complementary fin stop 78 on each fin 28 when the fin 28 is in the deployed configuration. In this manner, the spring 66 retains the fin 28 in the deployed configuration by biasing the fin 28 to engage the fin stop 78 with the respective fuselage stop 76.

Figure 3A:
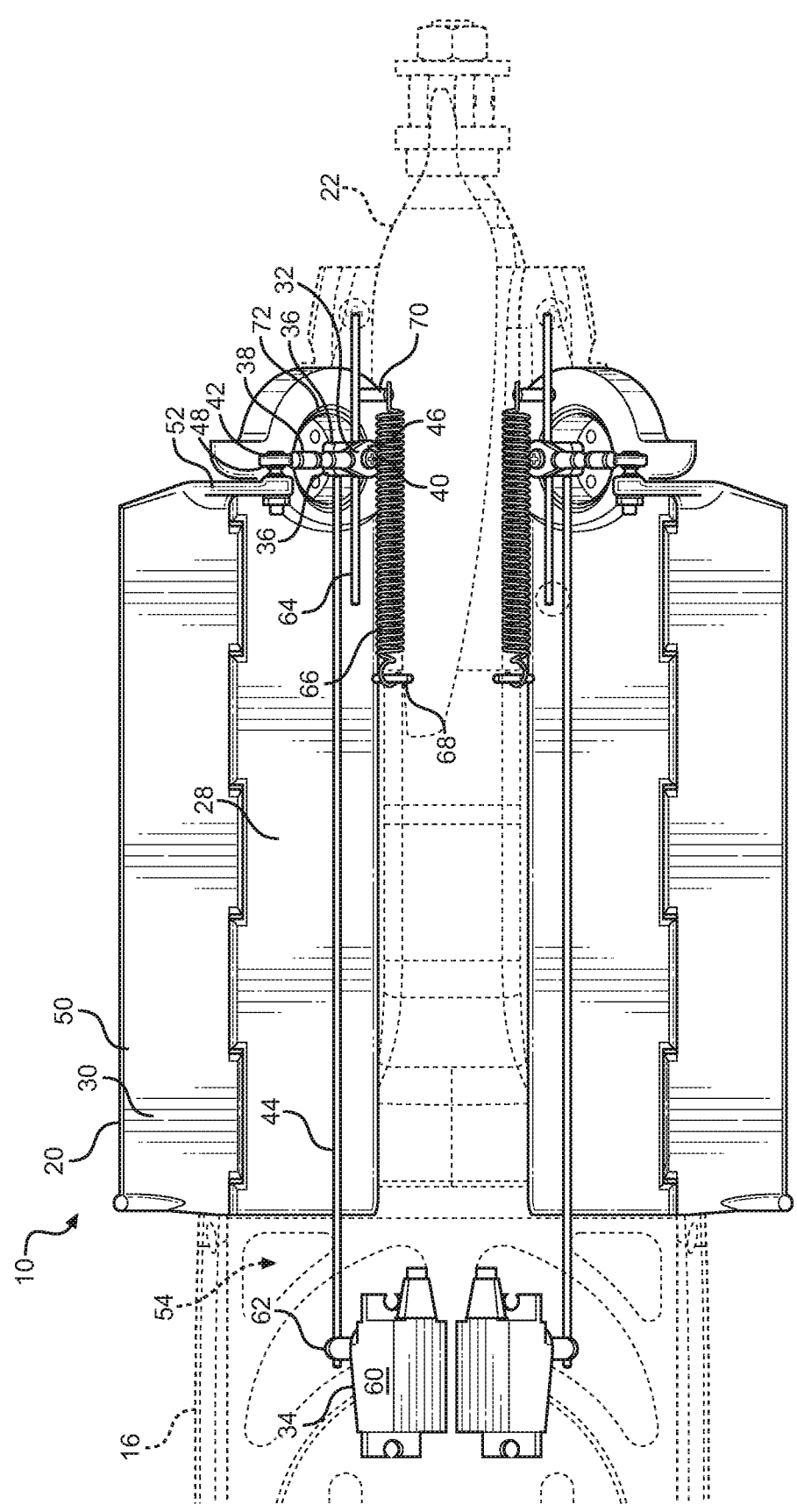
FIGS. 3A-3C illustrate internal components of the UAV of FIGS. 1A-2C in the stowed configuration, to illustrate operation of tail fin sub-assemblies of the UAV when stowed.
Figure 3B:
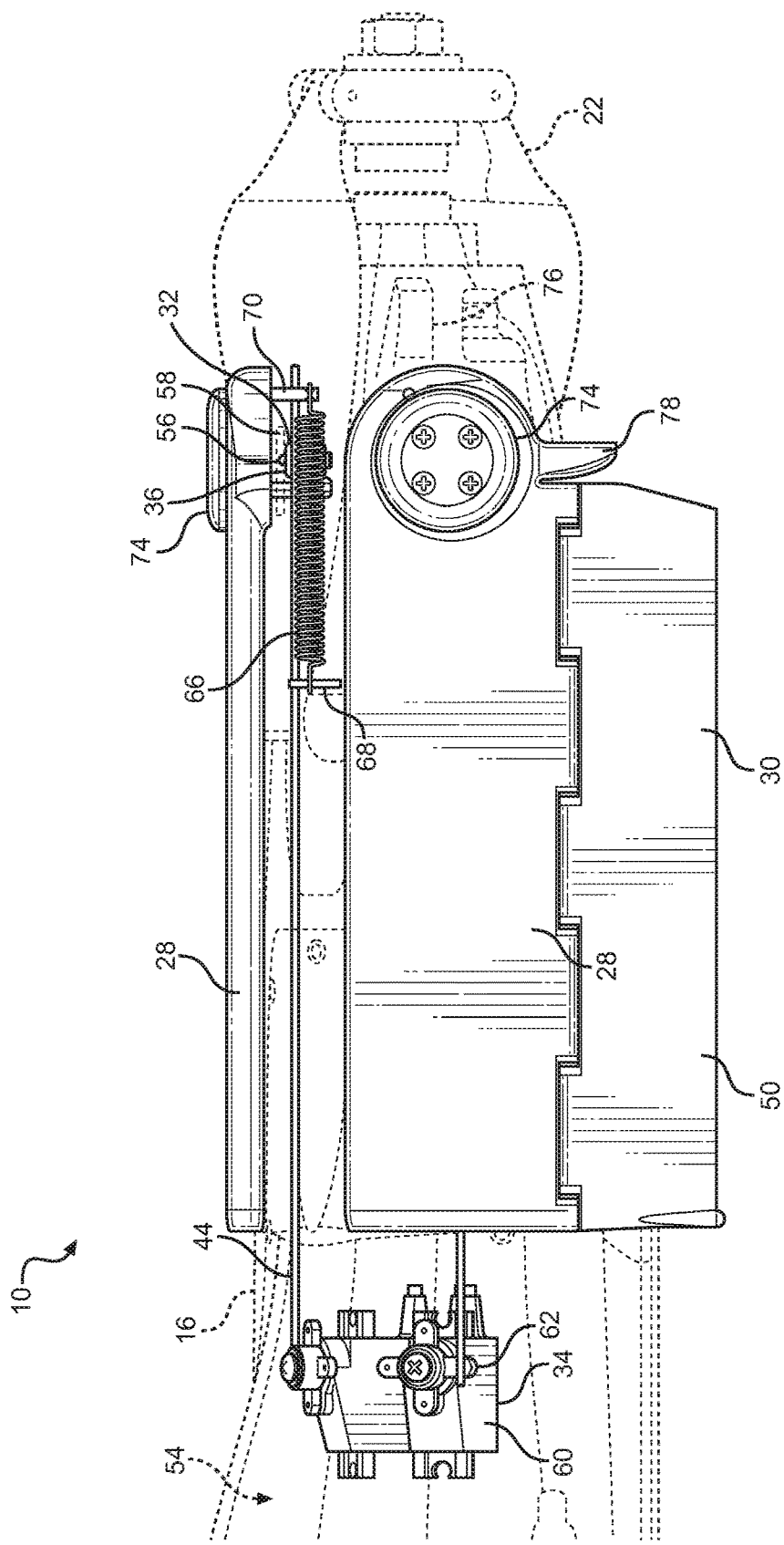
Figure 3C:
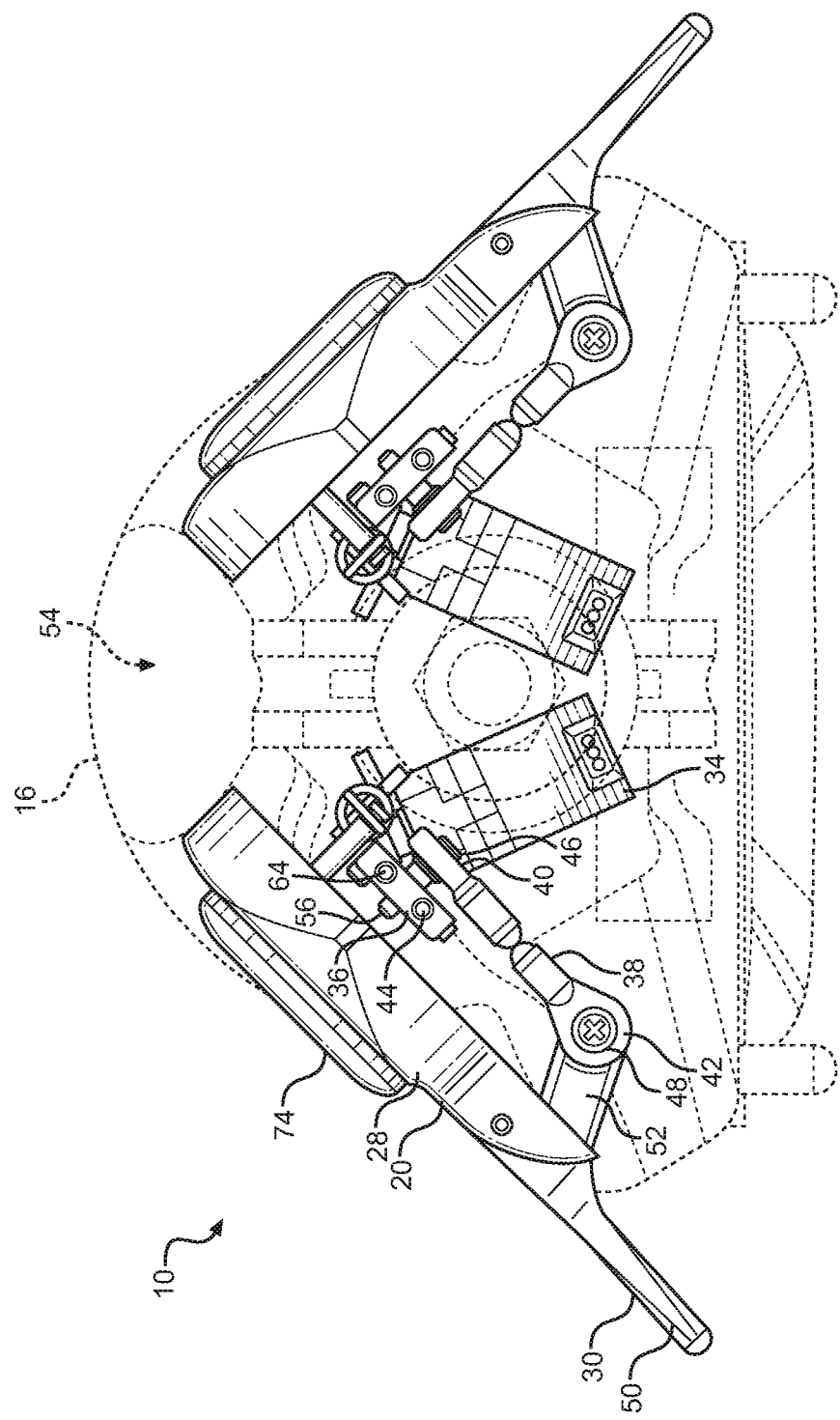

Having described the operation of the control surface linkage 32 when the tail fin sub-assembly 20 is in the deployed configuration, the arrangement and operation of the control surface linkage 32 when the tail fin sub-assembly 20 is in the stowed configuration will now be described with respect to FIGS. 3A-3C. In particular, FIGS. 3A-3C illustrate the same components of UAV 10 described above with respect to FIGS. 2A-2C, but in the stowed configuration. As shown by FIGS. 3A-3C, each fin 28 is rotated with respect to the fuselage 16 so as to be relatively flush and parallel with the fuselage 16. This permits the UAV 10 to be inserted into a storage receptacle, such as, for example, the storage and launch tube 14 described above with respect to FIG. 1A. Referring now to FIG. 3A, it can be seen that rotating the fin 28 causes the fin spring pin 70 to move away from the fuselage 16 spring pin 68, thereby extending and increasing tension in the spring 66. When the fin 28 is released, for example by being launched out of the storage and launch tube 14, the added tension in the spring 66 causes the fin 28 to quickly rotate back into the deployed configuration.

The control link 38 rotates with the fin 28 when the fin 28 is rotated to the stowed configuration. The control link 38 rotates about the first ball link 46 coupled to the translation member 36 at the first end 40 of the control link 38. When the translation member 36 is in a neutral position, the control link 38 is at a normal to the longitudinal direction. However, unlike in the deployed configuration, moving the translation member 36 in the stowed configuration, for example in response to actuating the actuator 34, will cause the control surface linkage 32 to move with respect to the fin 28 without rotating the control surface member 30. In this embodiment, actuating the actuator 34 instead causes the translation member 36 to rotate the control link 38 about the second ball link 48 coupled to the arm 52 of the control surface member 30 at the second end 42 of the control link 38. In this embodiment, the control link 38 rotates through an arc that includes the normal to the longitudinal direction. The movement characteristics of the control link 38 will be described below in greater detail with respect to FIGS. 6A and 6B.

Figure 4:
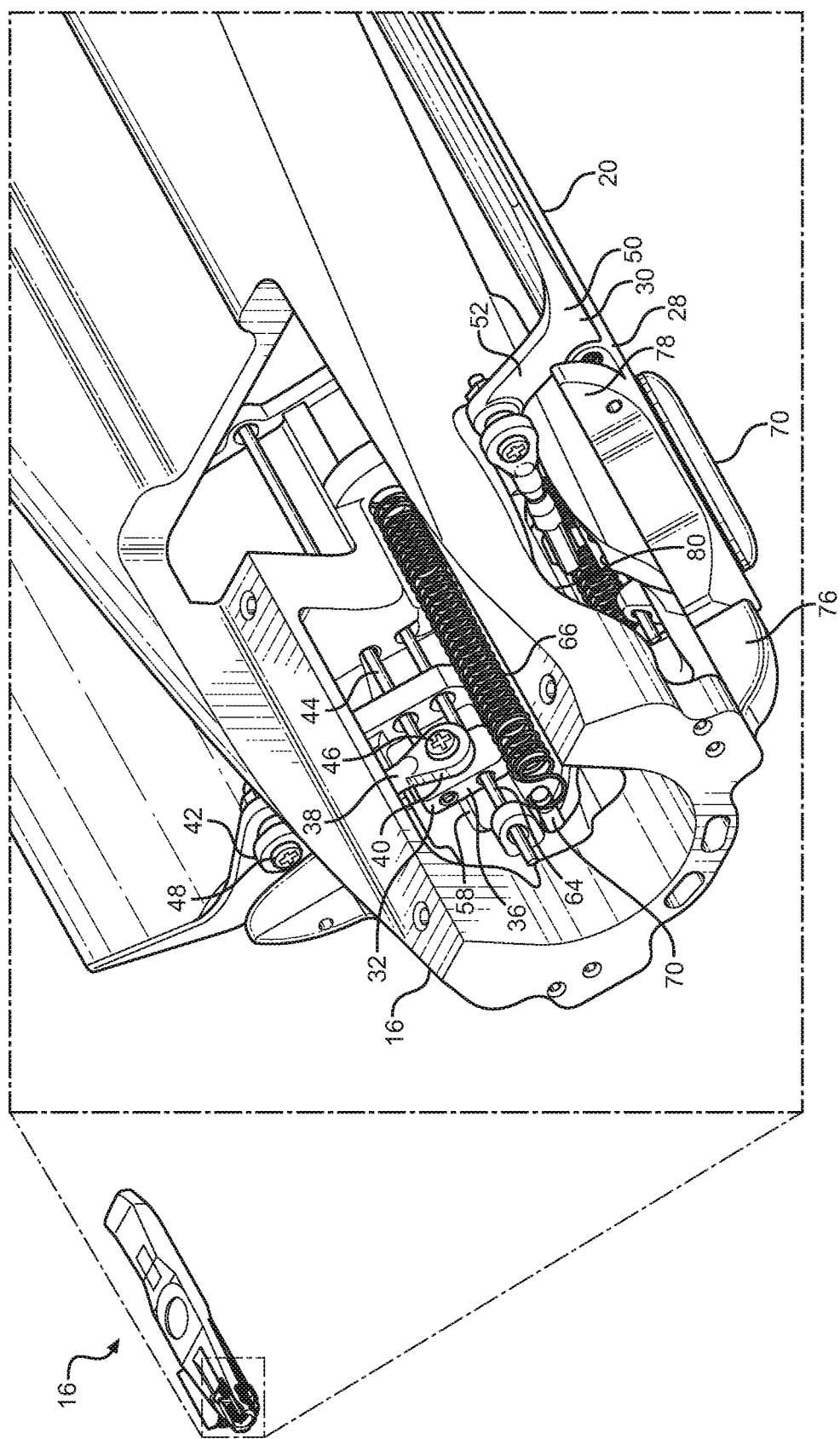
FIG. 4 illustrates a detail view of a portion of an inverted perspective view of the UAV according to the embodiment of FIGS. 1A-3C in the stowed configuration.

Referring now to FIG. 4, a detail view of a portion of an inverted perspective view of the UAV 10 according to the embodiment of FIGS. 2A-3C in the stowed configuration is illustrated. This view includes a cutaway of the fuselage 16 to show elements of the control surface linkage 32, including the translation member 36, the pushrod 44, and the control link 38. The fuselage 16 includes a slot 80 that allows the control link 38 to extend from the translation member 36 in the interior 54 of the fuselage 16 at the first end 40 to the arm 52 of the control surface member 30 at the second end 42. The slot 80 also permits the control link 38 to rotate with the control surface member 30 as the fin 28 is rotated with respect to the fuselage 16 between the stowed configuration and the deployed configuration.

Figure 5:
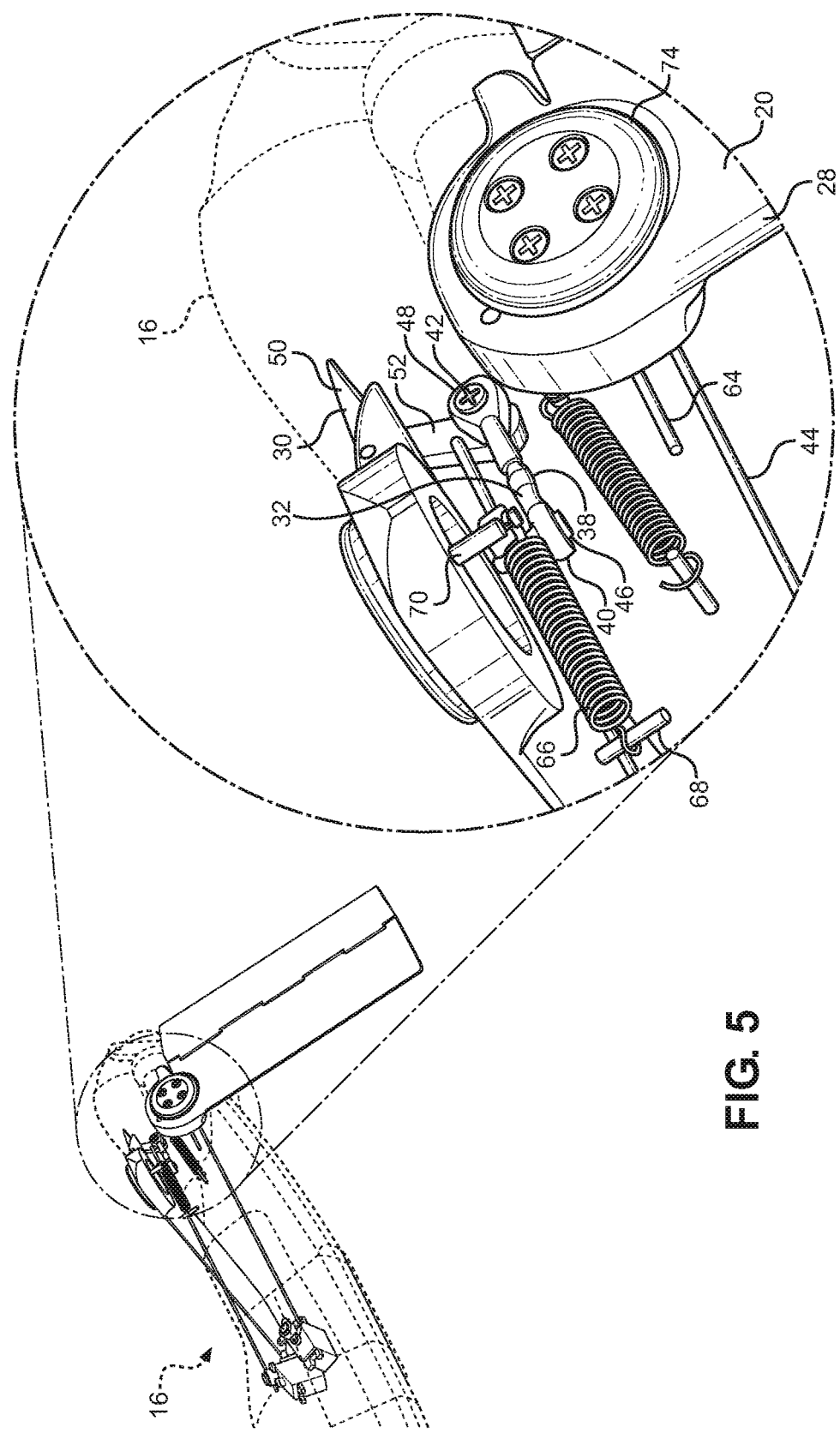
FIG. 5 illustrates a detail view of a portion of a perspective view of the UAV according to the embodiment of FIGS. 1A-4 in the deployed configuration.

In this regard, FIG. 5 is a detail view of a portion of a perspective view of the UAV 10 in the deployed configuration. As was described in detail above with respect to FIGS. 2A-2B, the control link 38 is substantially parallel with the longitudinal direction when the control surface member 30 is in the deployed configuration, thereby permitting the pushrod 44, the translation member 36, and the control link 38 to be actuated in unison to rotate the control surface member 30 with respect to the fin 28.

Figure 6A:
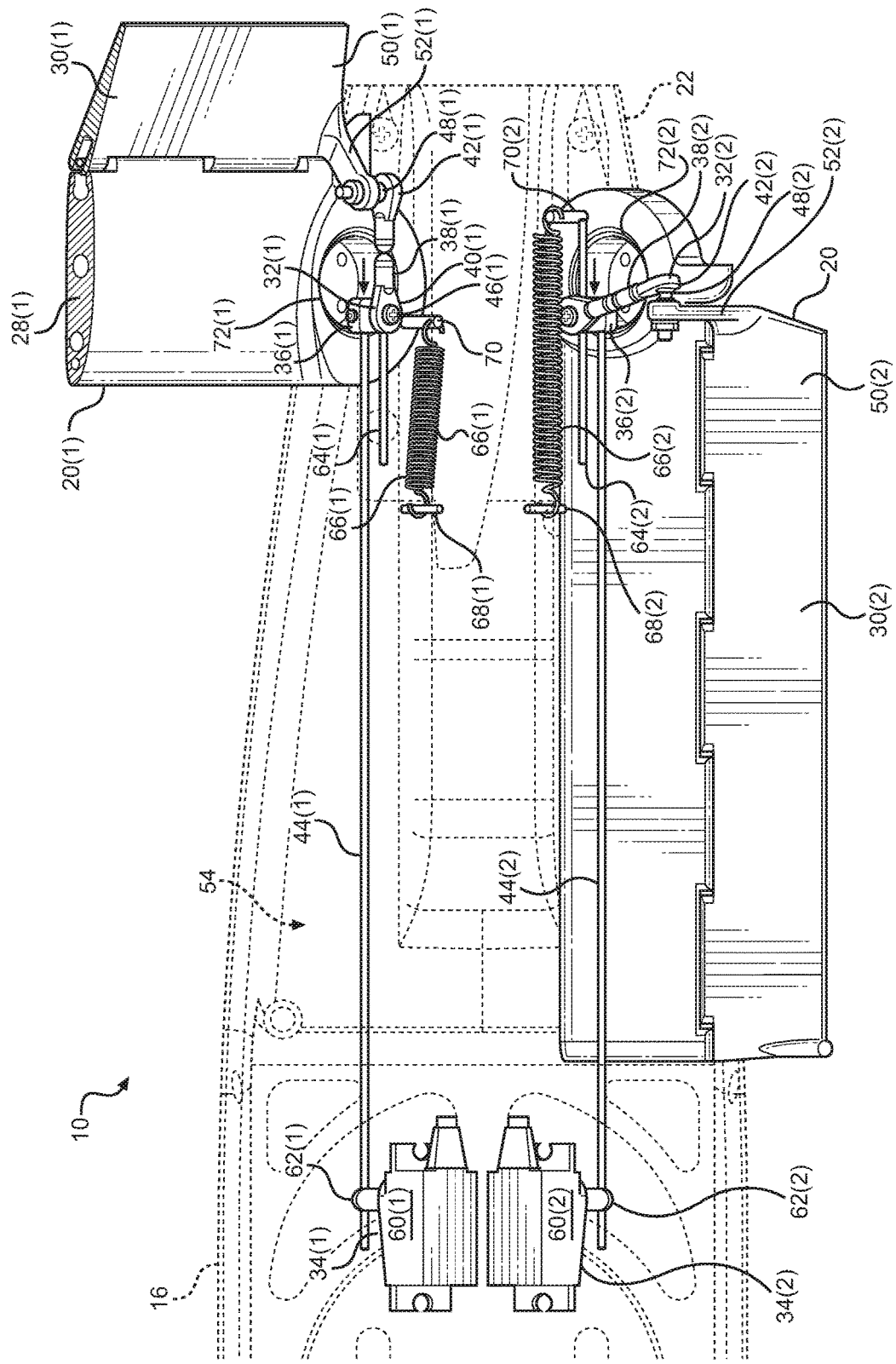
FIGS. 6A and 6B illustrate bottom cutaway views of the UAV of FIGS. 1A-5, with a left fin in the deployed configuration and a right fin in the stowed configuration.
Figure 6B:
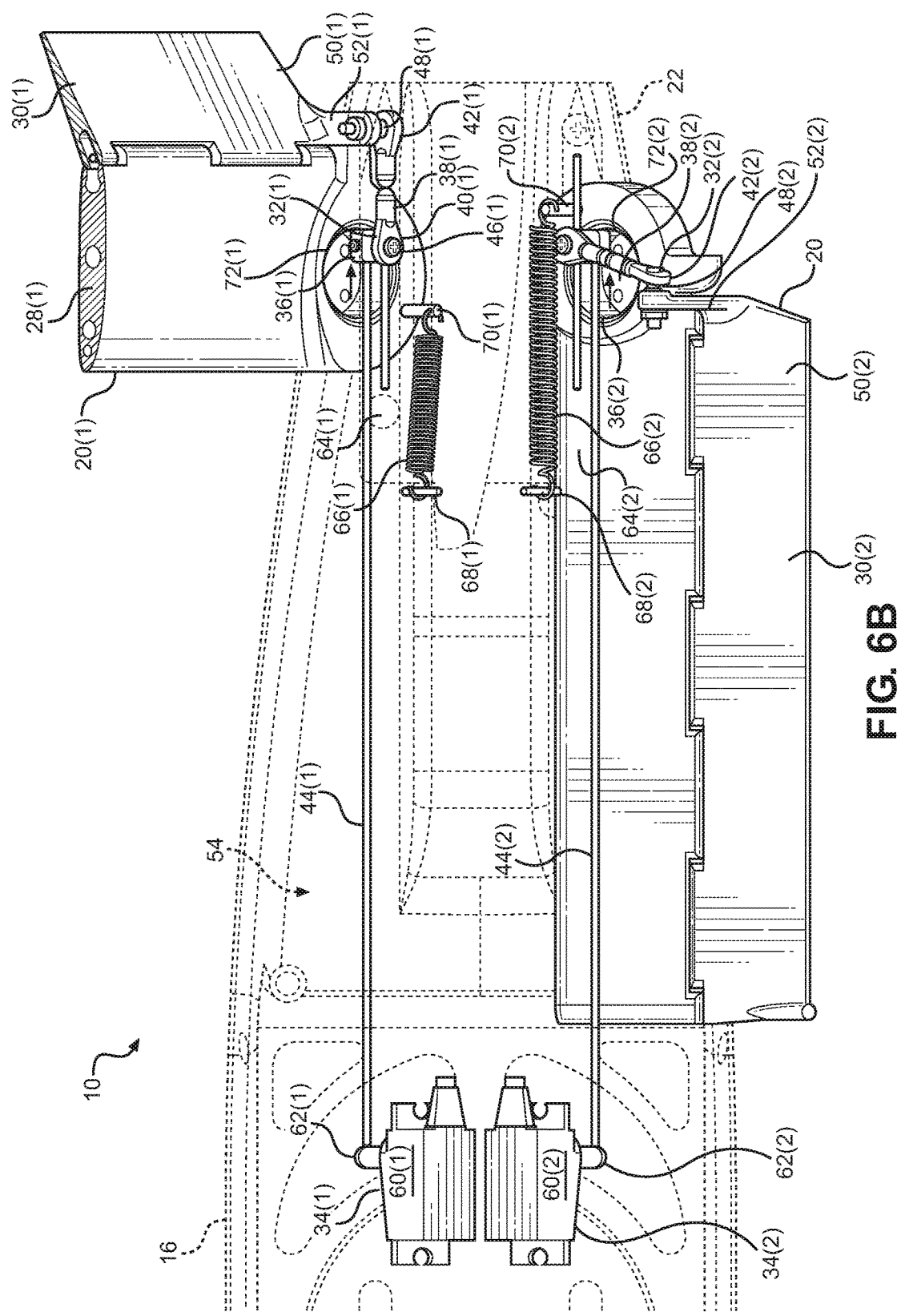

To further illustrate the movement and operation of the control link 38 in the stowed and deployed configurations, FIGS. 6A and 6B illustrate bottom cutaway views of the UAV 10, with the left fin 28(1) in the deployed configuration and the right fin 28(2) in the stowed configuration. For convenience, elements corresponding to the left side of the UAV 10 include a (1) designation below, and elements corresponding to the right side of the UAV 10 include a (2) designation below. In all other respects, the elements of FIGS. 6A and 6B correspond to elements discussed above with respect to FIGS. 1A-5.

In FIG. 6A, the left actuator 34(1) pulls the left pushrod 44(1) forward, thereby moving the left translation member 36(1) forward in the longitudinal direction. The left control link 38(1) is substantially parallel with the longitudinal direction because the left fin 28(1) is in the deployed configuration. As a result, the forward movement of the left control link 38(1) pulls the left arm 52(1) forward and causes the left control surface 50(1) of the left control surface member 30(1) to rotate downwardly with respect to the left fin 28(1).

In contrast, the right fin 28(2) of FIG. 6A is in the stowed configuration. Here, when the right actuator 34(2) causes the right translation member 36(2) to move forward, the right control link 38(2) rotates forward about the second ball link 48(2) coupled to the right arm 52(2) of the right control surface member 30(2) at the second end 42(2). In this embodiment, the first ball link 46(2) and second ball link 48(2) allow the control link 38 to rotate and twist with respect to the translation member 36(2) and arm 52(2) as needed when the fin 28(2) is in the stowed configuration, regardless of whether the translation member 36(2) is moved forward with respect to the fuselage 16.

Similarly, FIG. 6B illustrates movement and operation of the control link 38 in the stowed and deployed configurations when the translation members 36 are moved rearward by the actuators 34. Here again, because the left control link 38(1) is substantially parallel with the longitudinal direction when the left fin 28(1) is in the deployed configuration, movement of the left translation member 36(1) rearward causes the left control link 38(1) to push the left arm 52(1) rearward and causes the left control surface 50 of the left control surface member 30(1) to rotate upwardly with respect to left the fin 28(1). In contrast, when the right actuator 34(2) causes the right translation member 36(2) to move rearward, the right control link 38(2) rotates rearward about the right second ball link 48(2) coupled to the right arm 52(2) of the right control surface member 30(2) at the right second end 42(2), without moving the right control surface member 30(2) or causing any stress or damage to the right first ball joint 46(2), the second ball joint 48(2), or any other part of the right control surface linkage 32(2).

In the above embodiments, the translation member 36 is entirely disposed in the interior 54 of the fuselage 16, and the control link 38 is partially disposed in the interior 54 of the fuselage 16. One advantage of this arrangement is that, by disposing as many components as possible in the interior 54 of the fuselage 16, the UAV 10 can have fewer protuberances into the airstream around the UAV 10 during flight, thereby improving the aerodynamic profile and flight characteristics of the UAV 10. In other embodiments, however, space constraints may nevertheless require that additional components be disposed outside the aircraft.

In this regard, FIG. 7 illustrates partial cutaway view of a UAV 82 according to an alternate embodiment. In this embodiment, the UAV 82 includes a fuselage 84 having an alternative tail fin sub-assembly 86. The tail fin sub-assembly 86 includes a fin 88 rotatable about the fuselage 84 and a control surface member 90 rotatable about the fin 88. The UAV 82 also includes an alternate control surface linkage 92 having a translation member 94 extending through the fuselage 84 and a control link 96 rotatably coupled between the translation member 94 at a first end 98 and the control surface member 90 at the second end 100, with the entire control link 96 disposed outside the fuselage 84.

A pushrod 102 coupled to an actuator (not shown) moves the translation member 94, which causes the control link 96 to move the control surface member 90 via first ball link 104 and second ball link 106. The control surface member 90 includes a control surface 108 and arm 110 fixed with respect to the control surface 108 and rotatably coupled to the second ball link 106. In this embodiment, the pushrod 102 moves the translation member 94 along the longitudinal direction within a slot 114 that is fixed with respect to the fuselage 84, thereby causing the control link 96 to control the control surface member 90 when the fin 88 is in the deployed configuration and to move with respect to the control surface member 90 without moving the control surface member 90 when the fin 88 is in the stowed configuration (not shown). In this embodiment, each fin 88 has a circular recess 116 formed therein which matingly engages a gasket 118 coupled to the fuselage 84. The gasket 118 retains the fin 88 with respect to the fuselage 84 while permitting the fin 88 to rotate with respect to the fuselage 84 between the stowed and deployed configurations. In this embodiment, the slot 114 is formed in the gasket 118, thereby permitting the translation member 94 to move in the longitudinal direction along the slot 114, thereby permitting full movement of the control surface member 90 when the fin 88 is in the deployed configuration while minimizing movement of the control surface member 90 when the fin 88 is in the stowed configuration.

Figure 8:
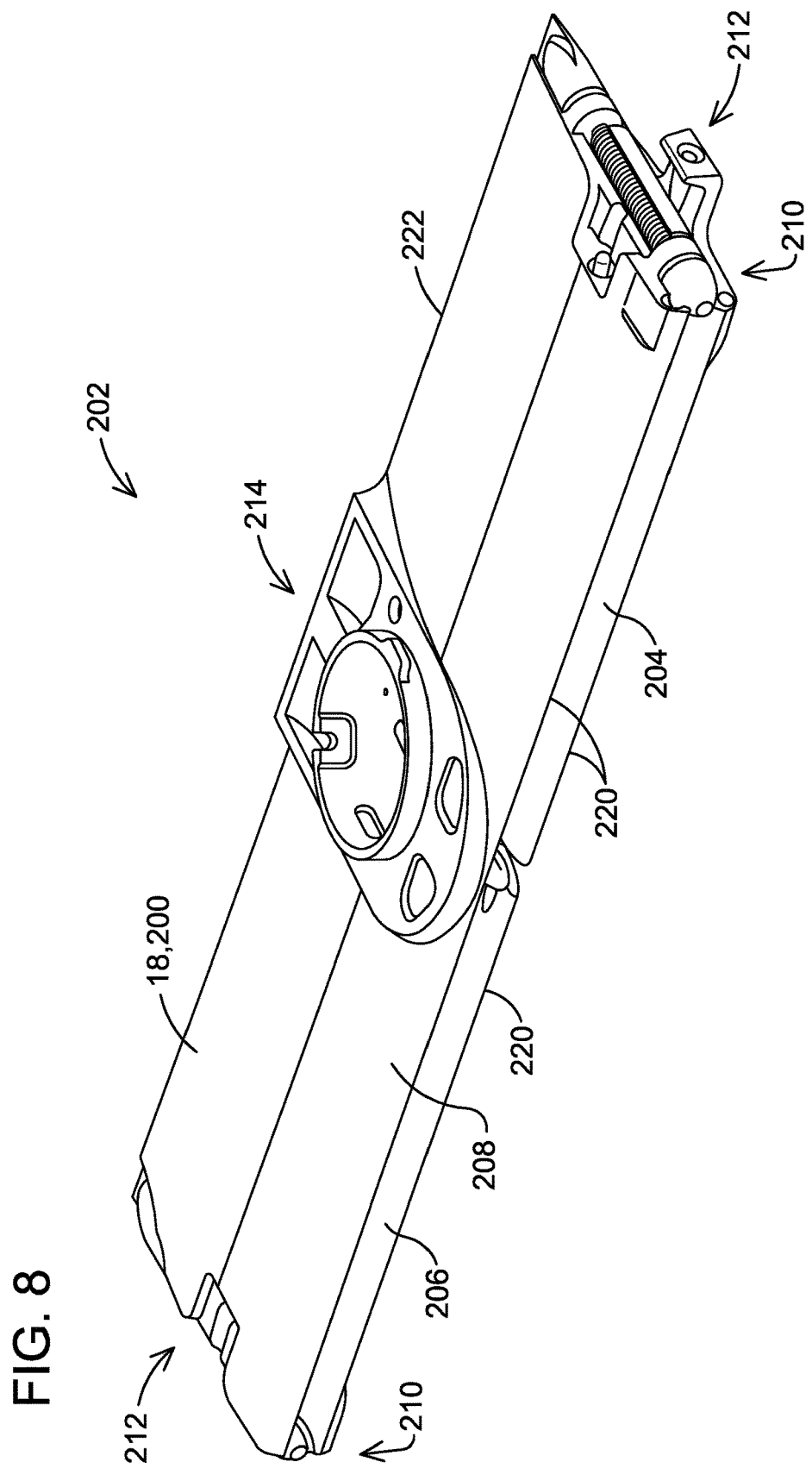
FIG. 8 illustrates a perspective view of an example embodiment of a trifold wing in a folded configuration.

FIG. 8 illustrates a perspective view of the wing sub-assembly 18. In an example embodiment, the wing sub-assembly 18 is a trifold wing 200 shown in a folded configuration 202, (as it is shown in FIG. 1A), where a port wing panel 204 and a starboard wing panel 206 are folded under a center wing panel 208. Wing joints 210 connect each of the port wing panel 204 and the starboard wing panel 206 to the center wing panel 208. A wing panel locking arrangement 212 is present at each wing joint 210 and locks a respective panel in a folded configuration (not shown). The center wing panel 208 includes a center wing section 214 at its mid-span that is part of a joint arrangement (not shown) between the center wing section 214 and the fuselage 16 (not shown). Each panel of the trifold wing 200 includes a leading edge 220 and a trailing edge 222. The port wing panel 204 is secured to the center wing panel 208 at a port end 224 of the center wing panel 208. The starboard wing panel 206 is secured to the center wing panel 208 at a starboard end 226 of the center wing panel 208.

As used herein, when referring to the trifold wing 200, the folded configuration 202 and the unfolded configuration describe a configuration where the port wing panel 204 and the starboard wing panel 206 are fully folded under the center wing panel 208. When referring to a specific panel, for example the port wing panel 204, the folded configuration describes the specific panel being fully folded under the center wing panel 208

Figure 9:
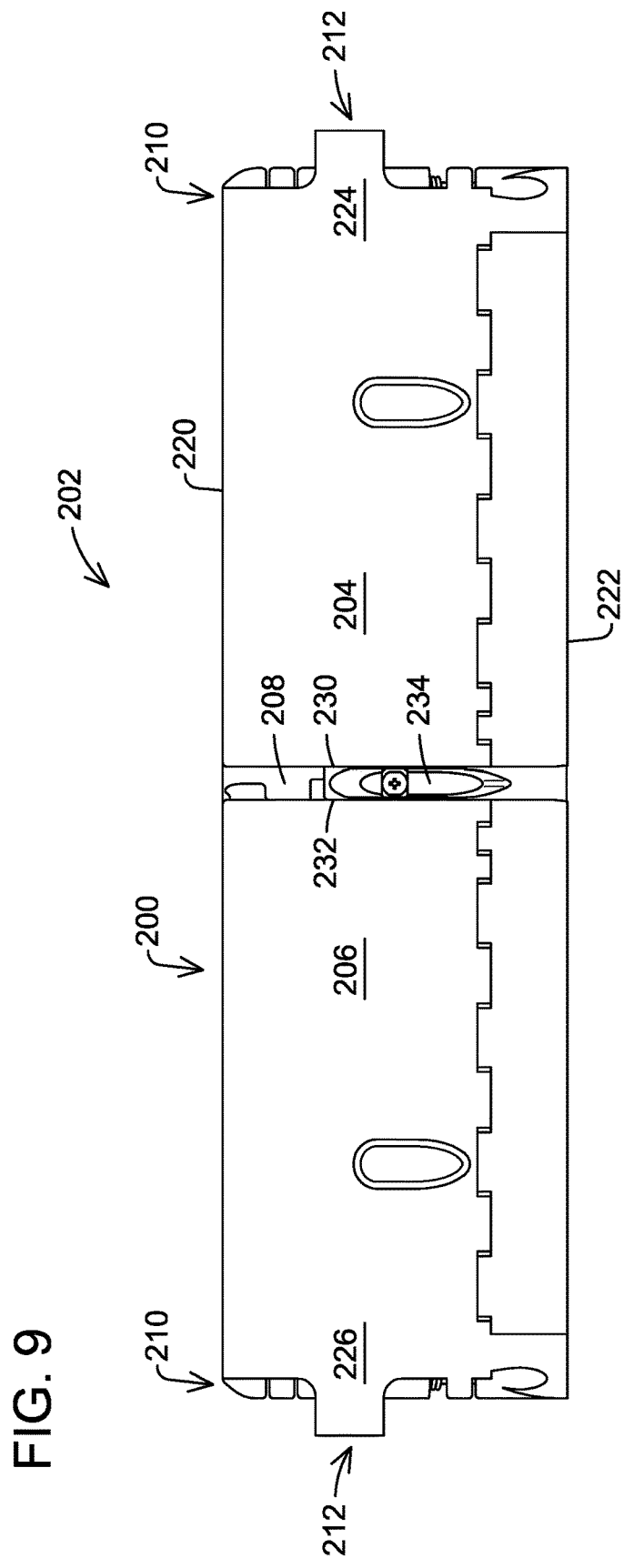
FIG. 9 illustrates a bottom view of the trifold wing of FIG. 8.

FIG. 9 shows a bottom view of the trifold wing 200 of FIG. 8. In the folded configuration 202 a port tip 230 of the port wing panel 204 and a starboard tip 232 of the starboard wing panel 206 are positioned adjacent to each other and separated by a pylon 234 that protrudes there between from the center wing panel 208.

Figure 10:
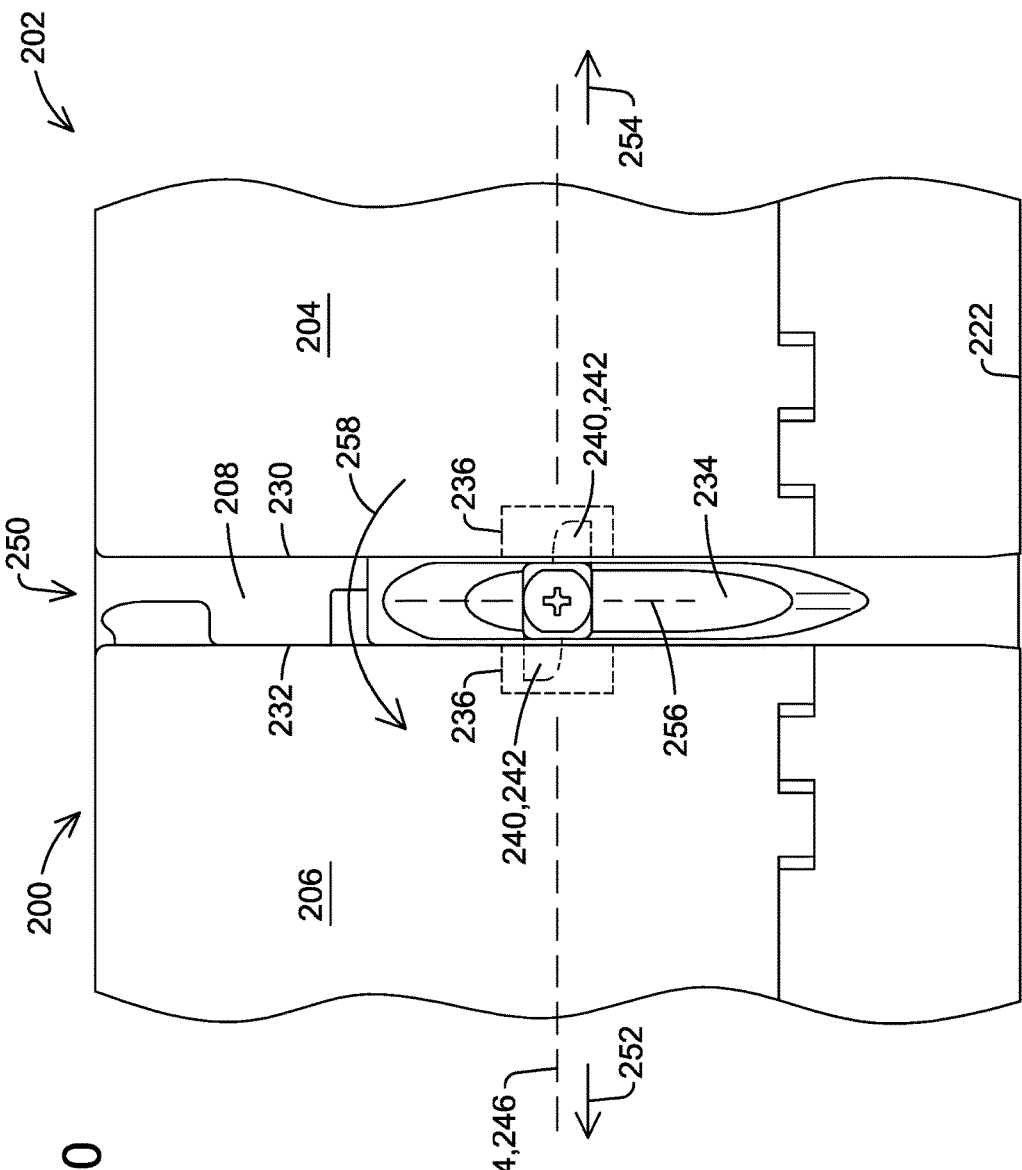
FIG. 10 illustrates a close-up view of the bottom view of FIG. 9.

FIG. 10 shows a close-up view of FIG. 9. Visible via dashed lines is a column feature 240 that is secured to a pivot column (not visible) and which protrudes from the pylon 234 into respective tip features, e.g. slots 236, in the tips 230, 232 of the panels 204, 206. In this example embodiment, the column feature 240 includes two tabs 242, each tab extending into a respective slot 236 in the tips 230, 232. The interaction of a respective tab 242 and a respective slot 236 holds the respective panel in the folded configuration 202 against a resilience of a spring in the wing joint 210 that constantly urges the respective panel to unfold.

The tabs 242 are aligned (e.g. parallel or close to parallel) with a longitudinal axis 244 of the fuselage 16 when the trifold wing 200 is in the stowed position 250, as is shown in FIG. 10. Similarly, a span wise axis 246 of the trifold wing 200 is also aligned (e.g. parallel or close to parallel) with the longitudinal axis 244 of the fuselage 16 when the trifold wing 200 is in the stowed position 250. As shown in FIGS. 8-10, forward 252 is to the left and aftward 254 is to the right. However, when the trifold wing 200 is in the stowed position 250, the column feature 240 is perpendicular or close to perpendicular to a long axis 256 of the pylon 234 to allow the column feature access to the tips 230, 232 of the panels 204, 206.

As used herein, the stowed position 250 and the deployed position refer to a relative angle (i.e. a clocking position) of the trifold wing 200 and/or any component thereof relative to the fuselage 16 as viewed looking along an axis of rotation of the trifold wing 200. For example, when the trifold wing 200 is in the stowed position 250, the trifold wing 200 is more aligned with the fuselage 16. Each part of the trifold wing 200 occupies a respective orientation with respect to the fuselage 16 when the trifold wing 200 is in the stowed position 250. When the trifold wing 200 is in the deployed position, the trifold wing 200 is more perpendicular to the fuselage 16, and each part of the trifold wing 200 occupies a different respective position relative to the fuselage 16. The center wing section 214 and the center wing panel 208 do not unfold between the stowed position and the deployed position. In contrast, the port wing panel 204 and the starboard wing panel 206 rotate and unfold, resulting in a change in relative angle and orientation. For sake of simplification, discussion of the stowed position 250 and the deployed position is limited to the change in relative angle between the center wing panel 208 and the fuselage 16, whether or not other changes in orientation in select components (e.g. the port wing panel 204 and the starboard wing panel 206) also occur.

When the trifold wing 200 rotates (counterclockwise in this view) from the stowed position 250 toward the deployed position (not shown), the tips 230, 232 of the panels 204, 206 rotate but the tabs 242 of the column feature 240 do not rotate. After a threshold amount of counterclockwise rotation 258 of the trifold wing 200, the tabs 242 disengage from the tips 230, 232 of the panels 204, 206, which frees the panels 204, 206 to unfold via the resilience of the spring in the respective wing joint 210. The threshold value can be selected as desired by choosing configurations for the column feature 240 and slots 236 that release at the selected threshold value.

Figure 11:
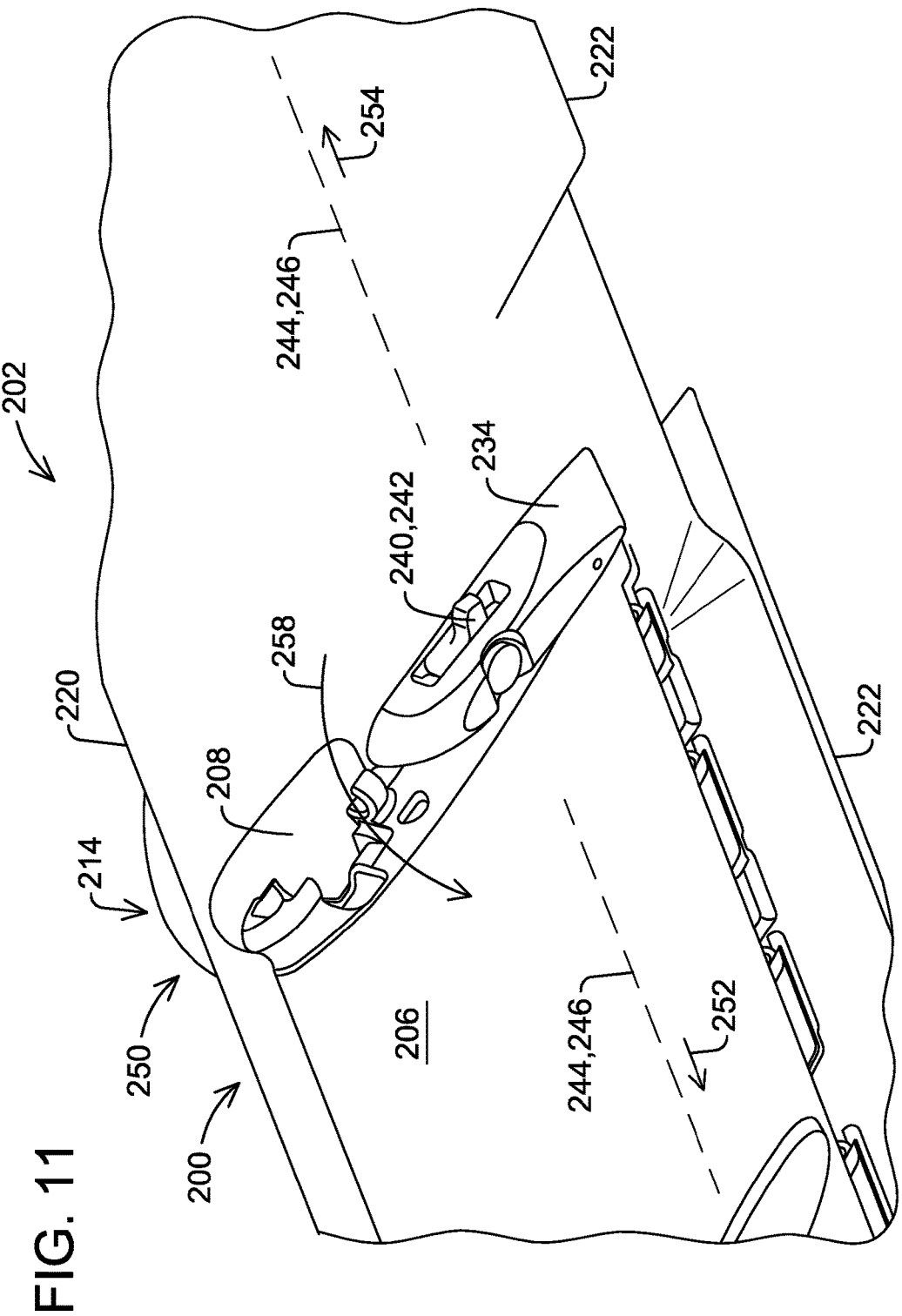
FIG. 11 illustrates a bottom perspective view of the trifold wing of FIG. 8, with a port wing panel removed.

FIG. 11 shows the trifold wing 200 with the port wing panel 204 removed to expose the tabs 242 projecting from the pylon 234 to engage the tips 230, 232 when the trifold wing 200 is in the folded configuration 202.

Figure 12:
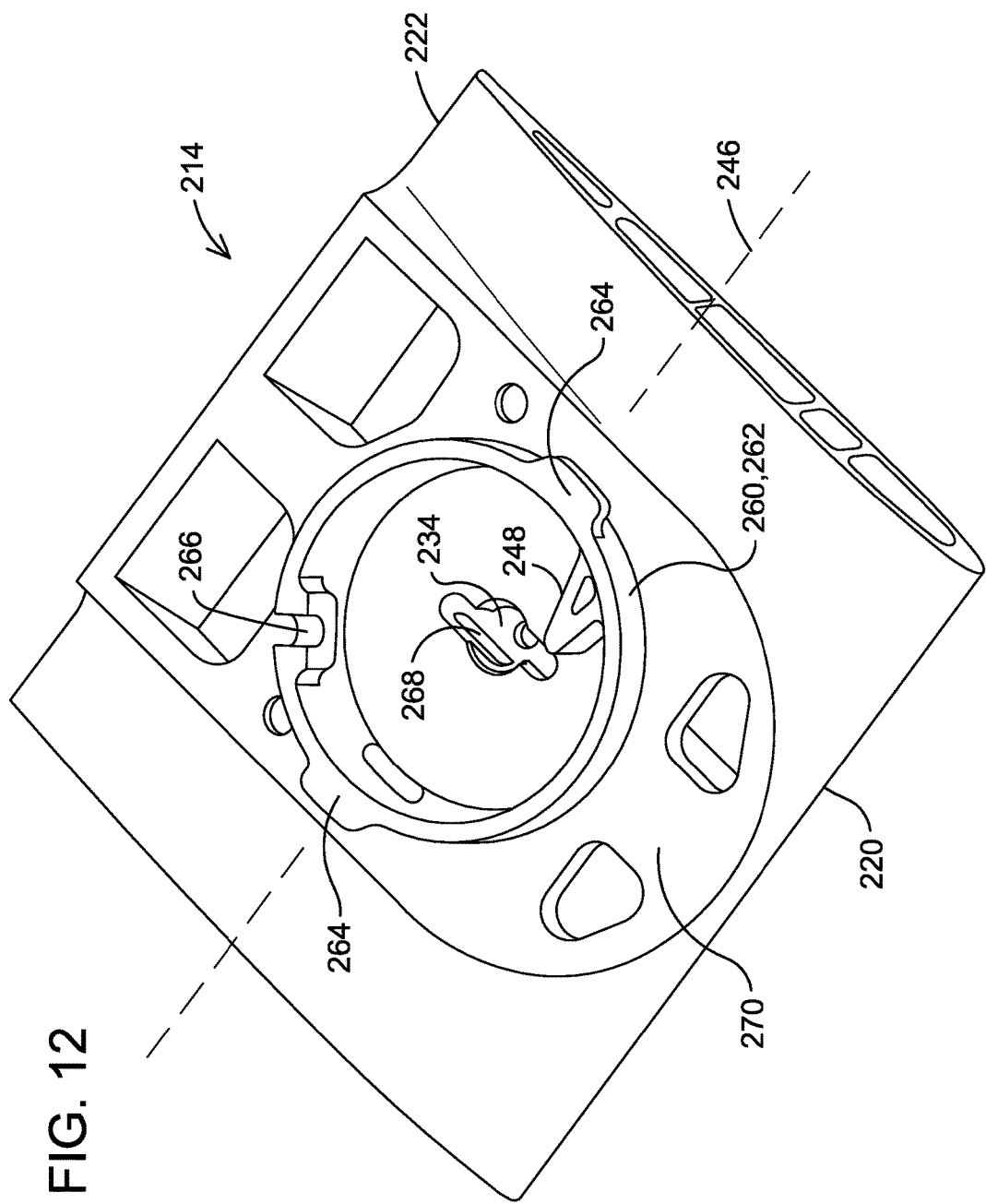
FIG. 12 illustrates a close-up view of an example embodiment of a center wing section of the trifold wing of FIG. 8.

FIG. 12 shows the center wing section 214 of the center wing panel 208. The center wing section 214 is part of a joint arrangement that secures the center wing panel 208 to the fuselage 16 and which enables the center wing panel 208 (and therefore the trifold wing 200) to rotate relative to the fuselage 16 from the stowed position 250 to the deployed position. The center wing section 214 may be integral to the center wing panel 208. Alternately, the center wing section 214 may be discrete and attached to the center wing panel 208.

In the example embodiment shown, the center wing section 214 includes a wing cylindrical surface 260 that are part of a turret 262 and which nest with a cylindrical surface in the fuselage 16. The center wing section 214 also includes tangs 264 which engage with the fuselage, thereby securing the center wing section 214 to the fuselage. In this example embodiment, the tangs 264 are aligned with the span wise axis 246 of the trifold wing 200. The center wing section 214 also includes wing spring rest 248 against which a resilient member pushes, thereby urging the trifold wing 200 to rotate from the stowed position 250 to the deployed position 302.

A locking pin feature 266 may be arranged to receive a locking pin when the center wing section 214 is in the deployed position 302. The pylon 234 is visible as are pylon slots 268 through which the tabs 242 protrude when the trifold wing 200 is in the stowed position 250. A wing mating surface 270 is configured to contact a fuselage mating surface (not shown) to ensure smooth rotation of the trifold wing 200.

Figure 13:
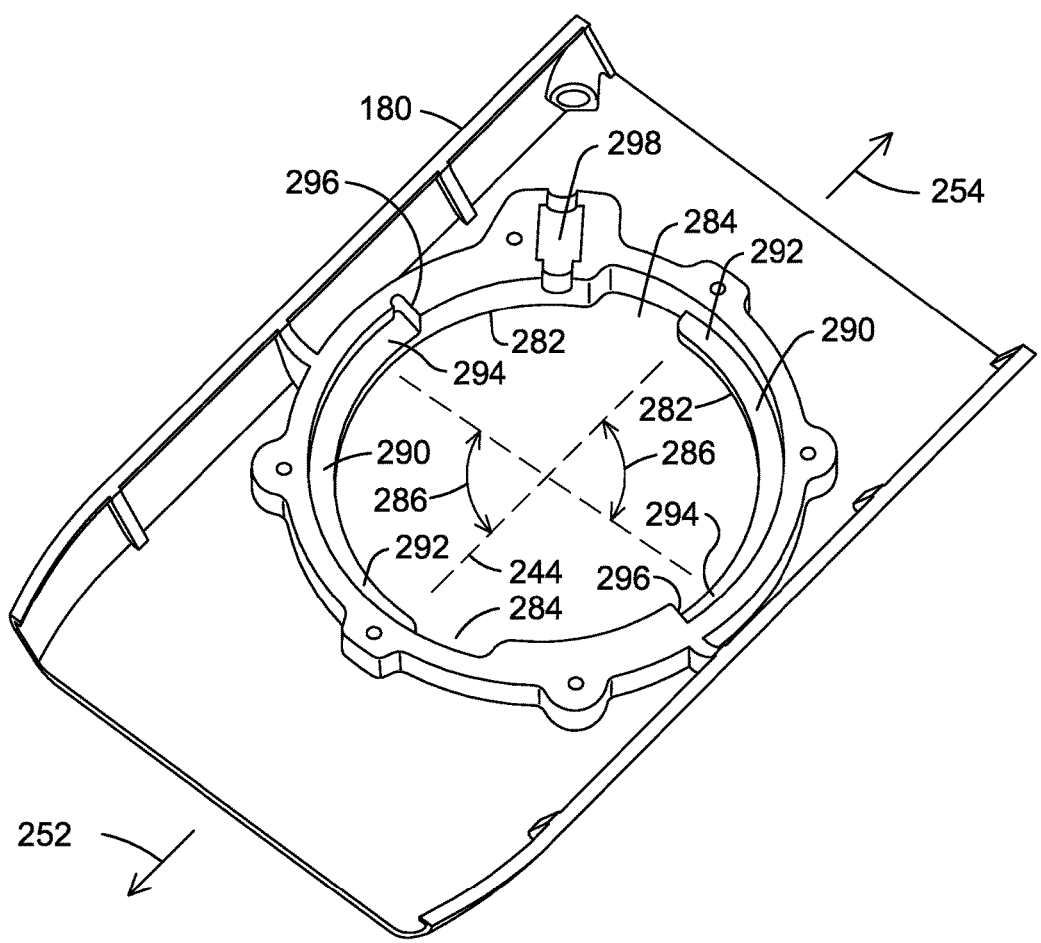
FIG. 13 illustrates a perspective view of an example embodiment of a fuselage body section.

FIG. 13 shows a fuselage body section 180 which is part of the joint arrangement that secures the center wing panel 208 to the fuselage 16. The fuselage body section 180 may be integral to the fuselage 16, or it may be a discrete component that is secured to the fuselage 16. A fuselage cylindrical surface 282 is configured to receive and nest with the wing cylindrical surface 260. This nesting of the cylindrical surfaces 260, 282, helps the center wing section 214 to rotate relative to the fuselage body section 180 in a controlled manner. The joint arrangement is not limited to this specific rotary joint, however.

Tang slots 284 are configured to receive the tangs 264 to enable the center wing section 214 to be inserted into the fuselage body section 180. The tang slots 284 are positioned circumferentially to be outside a range of positions 286 through which the tabs 242 will move when the trifold wing 200 rotates from the stowed position 250 to the deployed position. Ramps 290 are configured to engage the tangs 264 and hold the center wing section 214 to the fuselage 16. The ramps 290 cover the range of position 286 through which the tangs 264 will move during rotation. When the trifold wing 200 is in the in the stowed position 250, the tangs 264 are located at a beginning 292 of the ramp 290. When in the deployed position, the tangs 264 are located at an end 294 of the ramp 290 where the tabs abut ramp stops 296 that prevent further rotation of the center wing section 214. A locking pin receptacle 298 holds a locking pin (not shown) that engages the locking pin feature 266 in the center wing section 214 when the tangs 264 abut the stops 296. The engagement locks the center wing section 214 (and the trifold wing 200) into the deployed position. This arrangement is not meant to be limiting. Other arrangements that secure one component to another in a rotary joint may be used.

Figure 14:
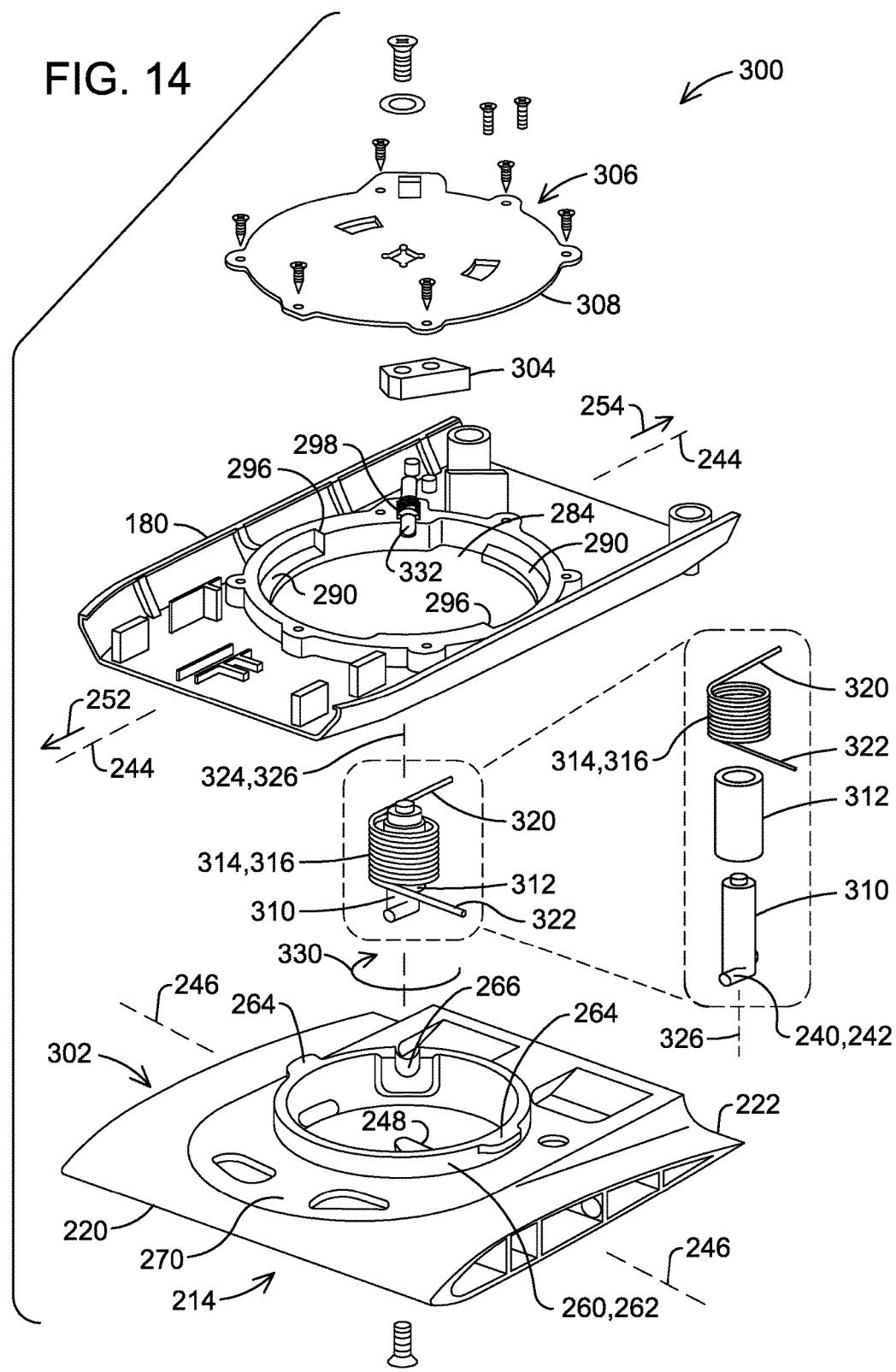
FIG. 14 illustrates an exploded view of an example embodiment of a joint arrangement.

FIG. 14 shows an exploded view of the joint arrangement 300, including the center wing section 214 and the fuselage body section 180. The center wing section 214 is shown in the deployed position 302 where the trifold wing 200 is positioned for flight. In the deployed position 302 the span wise axis 246 of the trifold wing 200 is perpendicular (or nearly perpendicular) to the longitudinal axis 244 of the fuselage 16, whereas in the stowed position 250 the span wise axis 246 is parallel (or more parallel to) to the longitudinal axis 244 of the fuselage 16. In the deployed position 302, the tangs 264 abut the stops 296.

A fuselage spring retainer 304 is secured to an underside 306 of a plate 308, and the plate 308 is secured to the fuselage body section 180. A pivot column 310 is secured in a fixed position to the plate 308. A pivot collar 312 fits over the pivot column 310 and is, in turn, disposed within a resilient member 314. In this example embodiment, the resilient member 314 is a coil spring 316 and the pivot collar 312 isolates the pivot column 310 from any contraction of an inner diameter of the coil spring 316. A fuselage end 320 of the coil spring 316 is secured relative to the plate 308 (and hence relative to the fuselage 16) via the fuselage spring retainer 304. A wing end 322 of the coil spring 316 rests against the wing spring rest 248 disposed on the center wing section 214.

When the center wing section 214 is in the deployed position 302 shown, the bias of the coil spring 316 has rotated (e.g. uncoiled) the wing end 322 of the coil spring 316 away from the fuselage end 320 in a clockwise direction 330 shown. The fuselage end 320 of the coil spring 316 is fixed relative to the fuselage spring retainer 304, which is fixed relative to the plate 308 and the fuselage 16. Since the fuselage end of the coil spring 316 is fixed relative to the fuselage 16, the movement of the wing end 322 of the coil spring 316 is relative to the fuselage 16. The wing end 322 abuts the wing spring rest 248 on the center wing section 214. When the wing end 322 of the coil spring 316 moves, the center wing section 214 moves with it. Therefore, uncoiling of the coil spring 316 rotates the center wing section 214, (and therefore the trifold wing 200), from the stowed position 250 to the deployed position 302 as shown. Rotation of the center wing section 214 is about rotation axis 324. The pivot column 310 defines a pivot column longitudinal axis 326. In the example embodiment shown, the rotation axis 324 and the pivot column longitudinal axis 326 are the same. However, they need not be the same so long as the same functionality is retained.

A locking pin 332 rests in the locking pin receptacle 298 and is aligned with the locking pin feature 266 in the center wing section 214 when the center wing section 214 is in the deployed position 302. The locking pin 332 is biased toward the locking pin feature 266 so that the alignment causes the locking pin feature 266 to project into the locking pin feature 266. This locks the center wing section 214 relative to the fuselage body section 180, thereby keeping the trifold wing 200 in the proper position for flight. The locking may be accomplished using the locking pin 332 or any other locking arrangement that can prevent the relative rotation.

Figure 15:
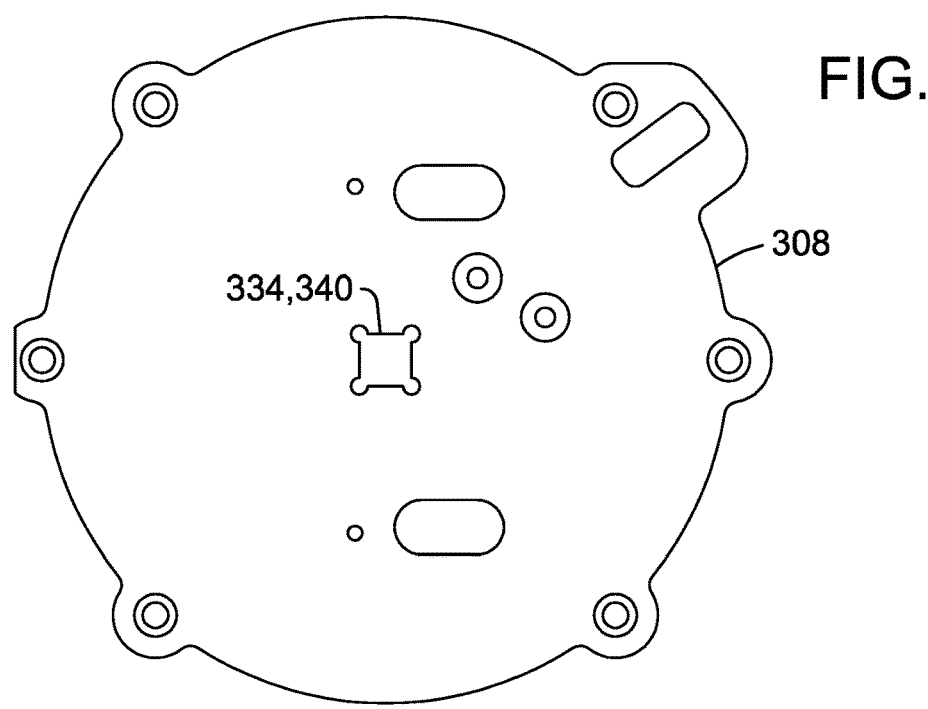
FIG. 15 illustrates an example embodiment of a top view of a plate of the joint arrangement of FIG. 14.
Figure 16:
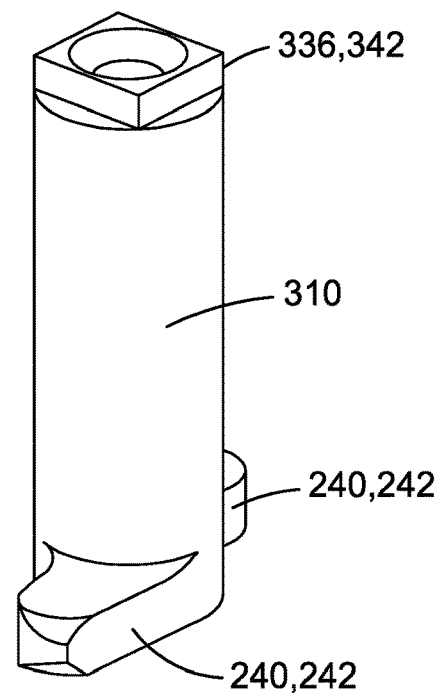
FIG. 16 illustrates an example embodiment of a pivot column of the joint arrangement of FIG. 14.

FIGS. 15 and 16 show the plate 308 and the pivot column 310 respectively. The plate 308 includes a plate securing feature 334 that engages a column securing feature 336 of the pivot column 310. The securing features may be any that cooperate to secure the pivot column 310 to the plate 308 and prevent relative rotation there between. In this example embodiment, the plate securing feature 334 is a square hole 340 that is keyed to a square end 342 of the pivot column 310. The pivot column 310 may be secured to the plate via a screw, or adhesive, or may be integral with the plate 308 (e.g. the plate 308 and the pivot column 310 may be a monolithic body).

The column feature 240 is located at an opposite end of the pivot column 310, and are likewise held in a fixed position relative to the fuselage 16 by the square hole 340 of the plate 308 that is keyed to the square end 342 of the pivot column 310.

Figure 17:
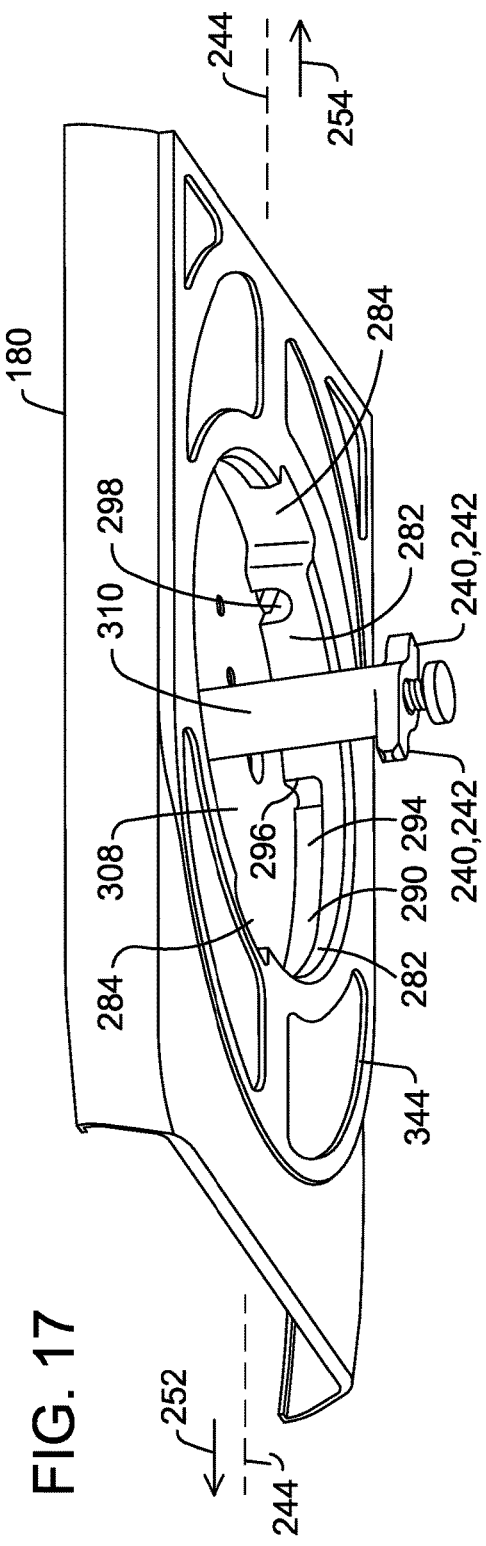
FIG. 17 illustrates a bottom perspective view of a partial assembly of the joint arrangement of FIG. 14.

FIG. 17 shows the pivot column 310 secured to the plate 308 which is, in turn, secured to the fuselage body section 180. The column feature 240 is substantially aligned with the longitudinal axis 244 of the fuselage 16. Also visible is the fuselage mating surface 344 configured to contact the wing mating surface 270 on the center wing section 214 to ensure smooth rotation of the trifold wing 200.

Figure 18:
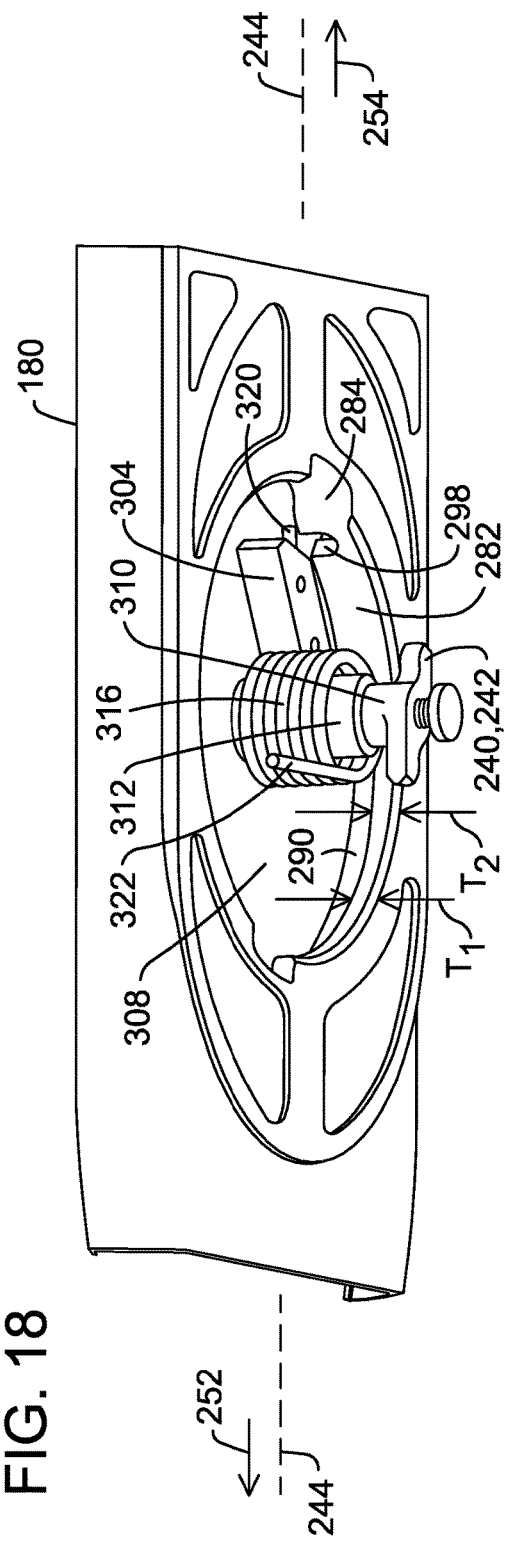
FIG. 18 illustrates a bottom perspective view of a partial assembly of the joint arrangement of FIG. 14.

FIG. 18 shows the pivot collar 312 and the coil spring 316 assembled in place around the pivot column 310. In one example embodiment, the fuselage end 320 of the coil spring 316 is secured in the fuselage spring retainer 304. The wing end 322 of the coil spring 316 is shown in the position it takes when the center wing section 214 is in the deployed position 302 as seen in FIG. 14.

A first thickness $T_1$ of the fuselage body section 180 that forms the ramp 290 is less than a second thickness $T_2$. Consequently, as the center wing section 214 and the tangs 264 rotate toward the deployed position 302, the center wing section 214 is pulled closer to the fuselage body section 180. This cinches the two together, creating a frictional force there between that helps the locking pin 332 keep the center wing section 214 in the deployed position 302.

In addition, when the center wing section 214 is in the stowed position 250, the first thickness $T_1$ allows for a small gap to exist between the fuselage mating surface 344 and the wing mating surface 270. When the center wing section 214 rotates from the stowed position 250 to the deployed position 302, undersides of tangs 264 ride circumferentially on the ramps 290 with relatively less friction until the undersides of tangs 264 make full contact with the end 294 of the ramp 290, at which time the tangs 264 abut the stops 296. At this point the gap between the fuselage mating surface 344 and the wing mating surface 270 decreases to reduce a rocking motion of the span wise axis 246 about the longitudinal axis 244 of the fuselage 16.

This change in the gap offers benefits. It reduces the amount of friction between the fuselage mating surface 344 and the wing mating surface 270 that resists the rotation of the center wing section 214 during deployment. This reduced friction helps achieve the proper timing of the deployment of the rotation of the center wing section 214. It also holds the center wing section 214 tight against the fuselage 16 when the center wing section 214 is in the deployed position 302. This tight fit there between enables the fuselage 16 and the center wing section 214 to act as a single, rigid body in response to aileron input from the trifold wing 200.

Figure 19:
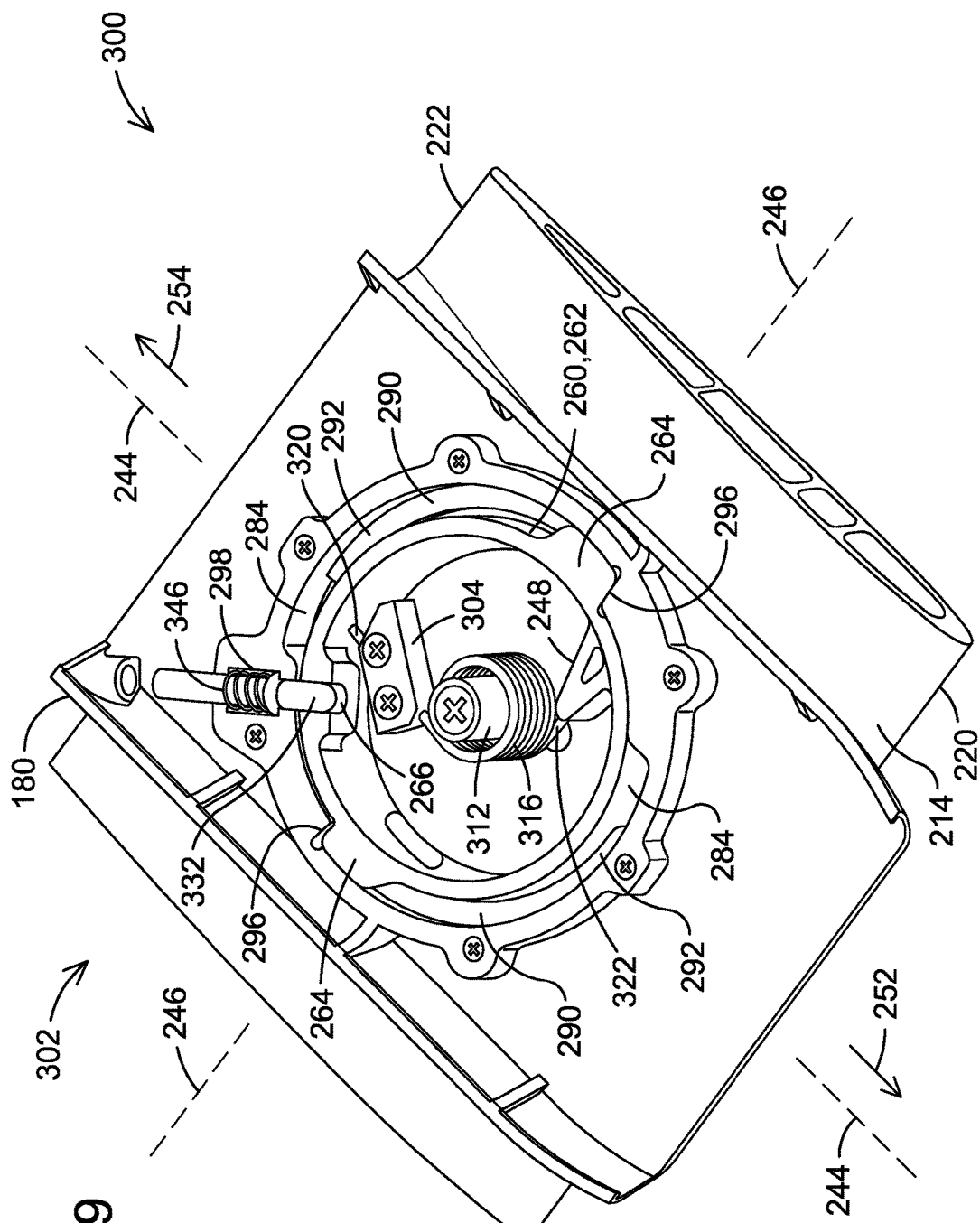
FIG. 19 illustrates a perspective view of the joint assembly of FIG. 14 with the plate removed.

FIG. 19 shows the joint arrangement 300 assembled with the center wing section 214 (and trifold wing 200) in the deployed position 302. The plate 308 is not shown so the other components can be seen. The wing end 322 of the coil spring 316 has uncoiled about the pivot column 310, taking the wing spring rest 248 with it, which rotated the center wing section 214 in the clockwise direction 330 until the tangs 264 contacted the ramp stops 296. Upon this contact, the locking pin 332 projected into the locking pin feature 266 under the bias of a locking pin spring 346, thereby locking the center wing section 214 (and the trifold wing 200) in the deployed position 302.

Figure 20:
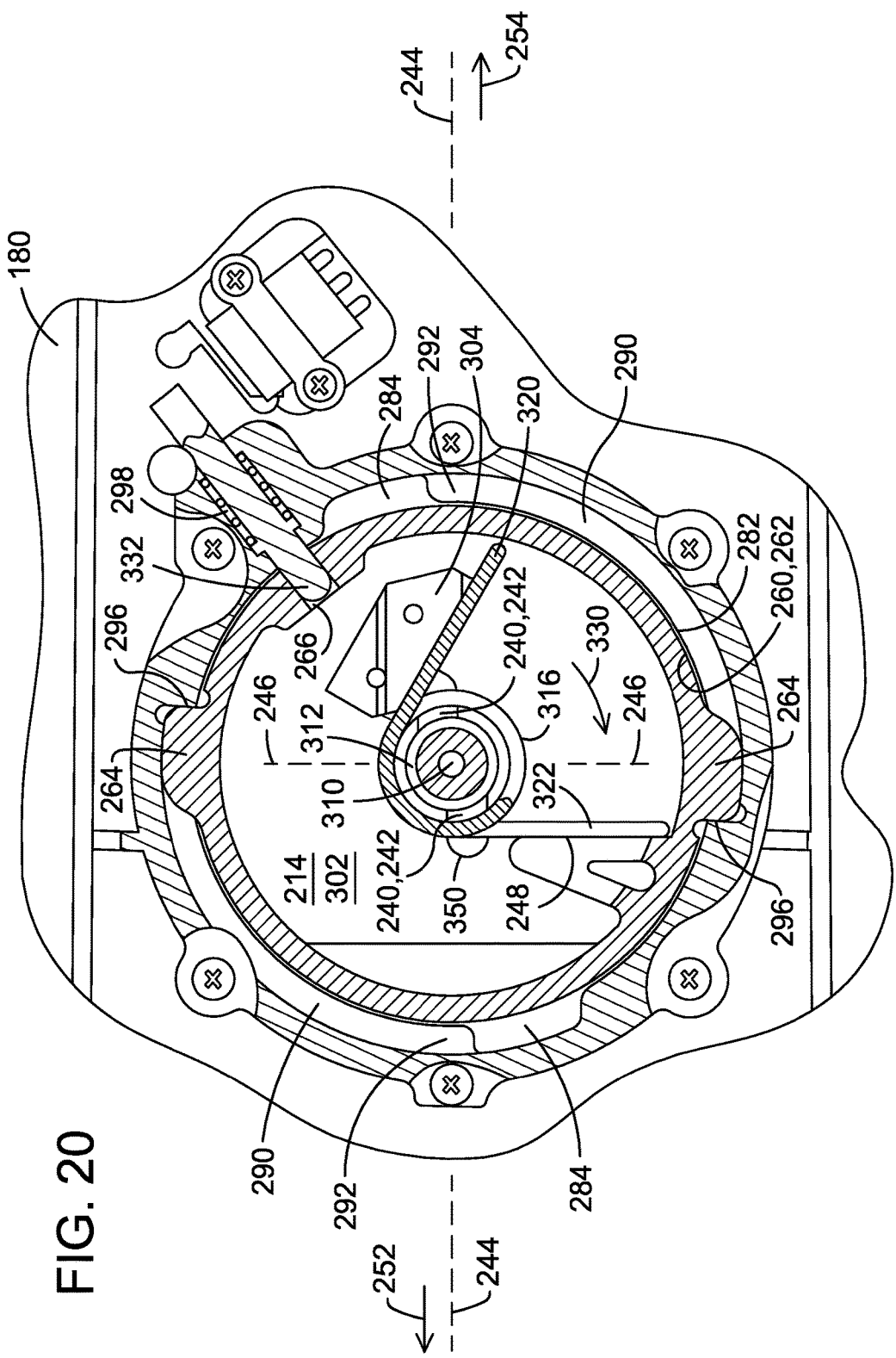
FIG. 20 illustrates a top view of the joint assembly of FIG. 14 with the plate removed and in the deployed configuration.

FIG. 20 shows the top view of the joint arrangement 300 of FIG. 19. A column feature pass-through 350 allows the column feature 240 to pass through the center wing section 214 during assembly, thereby placing the column feature 240 below the center wing section 214 and below the center wing panel 208 to access the tips 230, 232 of the panels 204, 206 when the trifold wing 200 is in the folded configuration and stowed position (not shown).

In this example embodiment, instead of securing the fuselage end 320 of the coil spring 316 in the fuselage spring retainer 304, the fuselage end 320 of the coil spring 316 rests against (e.g. abuts) the fuselage spring retainer 304. These configurations are not meant to be limiting, and other arrangements could be used so long as they enable the intended function of the spring ends.

Figure 21:
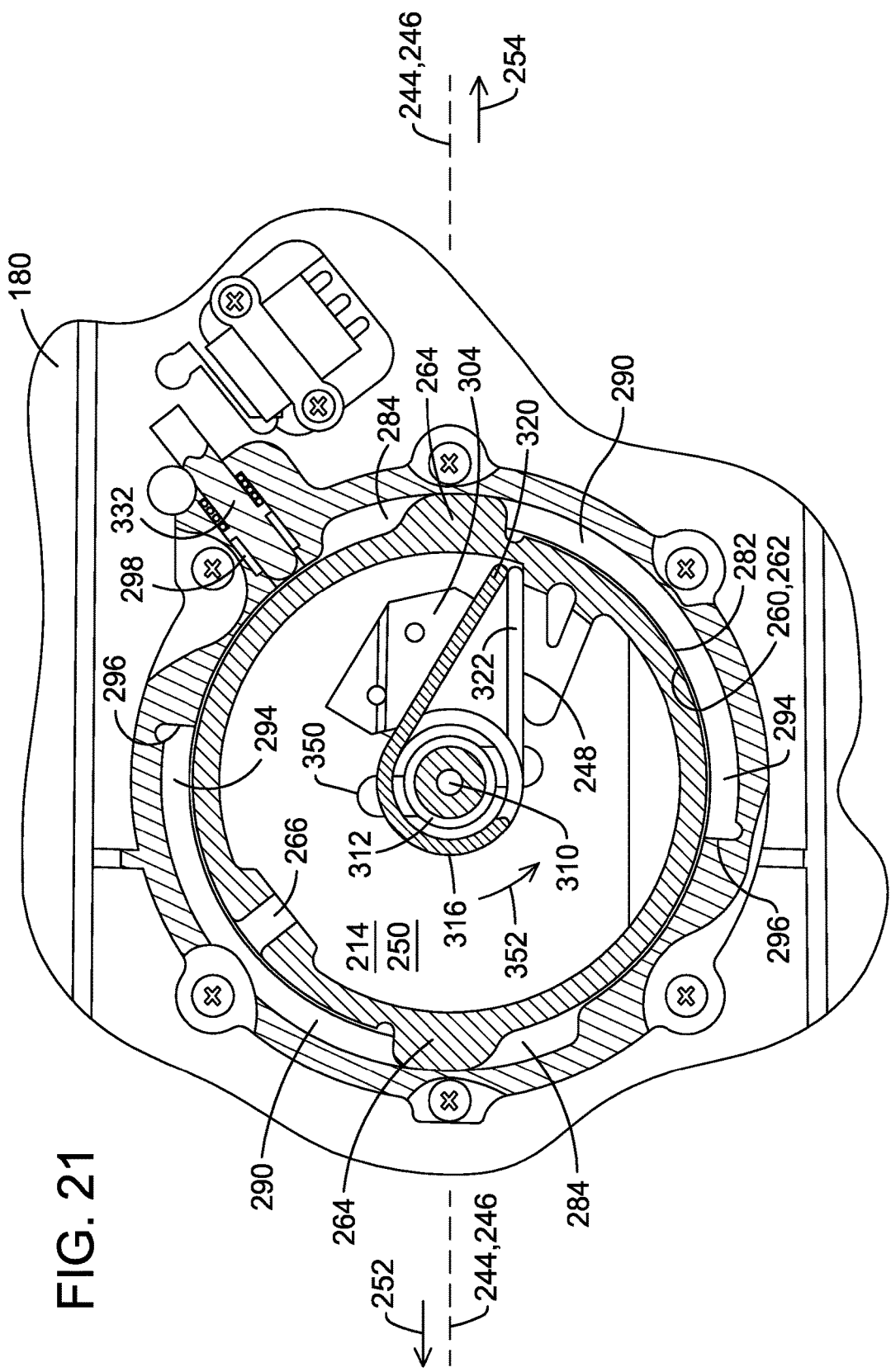
FIG. 21 illustrates a top view of the joint assembly of FIG. 14 with the plate removed and in the stowed configuration.

FIG. 21 shows the top view of the joint arrangement 300, but with the center wing section 214 (and trifold wing 200) in the stowed position 250. The plate 308 is not shown so the other components can be seen. The center wing section 214 (and trifold wing 200) have been rotated in a counterclockwise direction 352 until the span wise axis of the trifold wing 200 is parallel or at least more aligned with the longitudinal axis 244 of the fuselage 16. This rotated the wing spring rest 248 and wing end 322 of the coil spring 316 in the counterclockwise direction 352 as well. The column feature pass-through 350 has also rotated with the center wing section 214, (but the column feature 240 (not visible) has not rotated with the center wing section 214).

The trifold wing 200 is restrained in the stowed position 250 against the bias of the coil spring 316 by an external restraint (not shown). For example, the trifold wing 200 may be so held manually, or by being placed in the launch tube 14 or the like. Removal of the external restraint, such as by launching the UAV 10 from the launch tube 14, frees the trifold wing 200. Once the trifold wing 200 is free, the bias of the coil spring 316 causes the wing end 322 to rotate in the clockwise direction 330, which rotates the center wing section 214 to the deployed position 302. This process is repeatable, thereby permitting the UAV 10 to be launched and stowed as desired.

Figure 22:
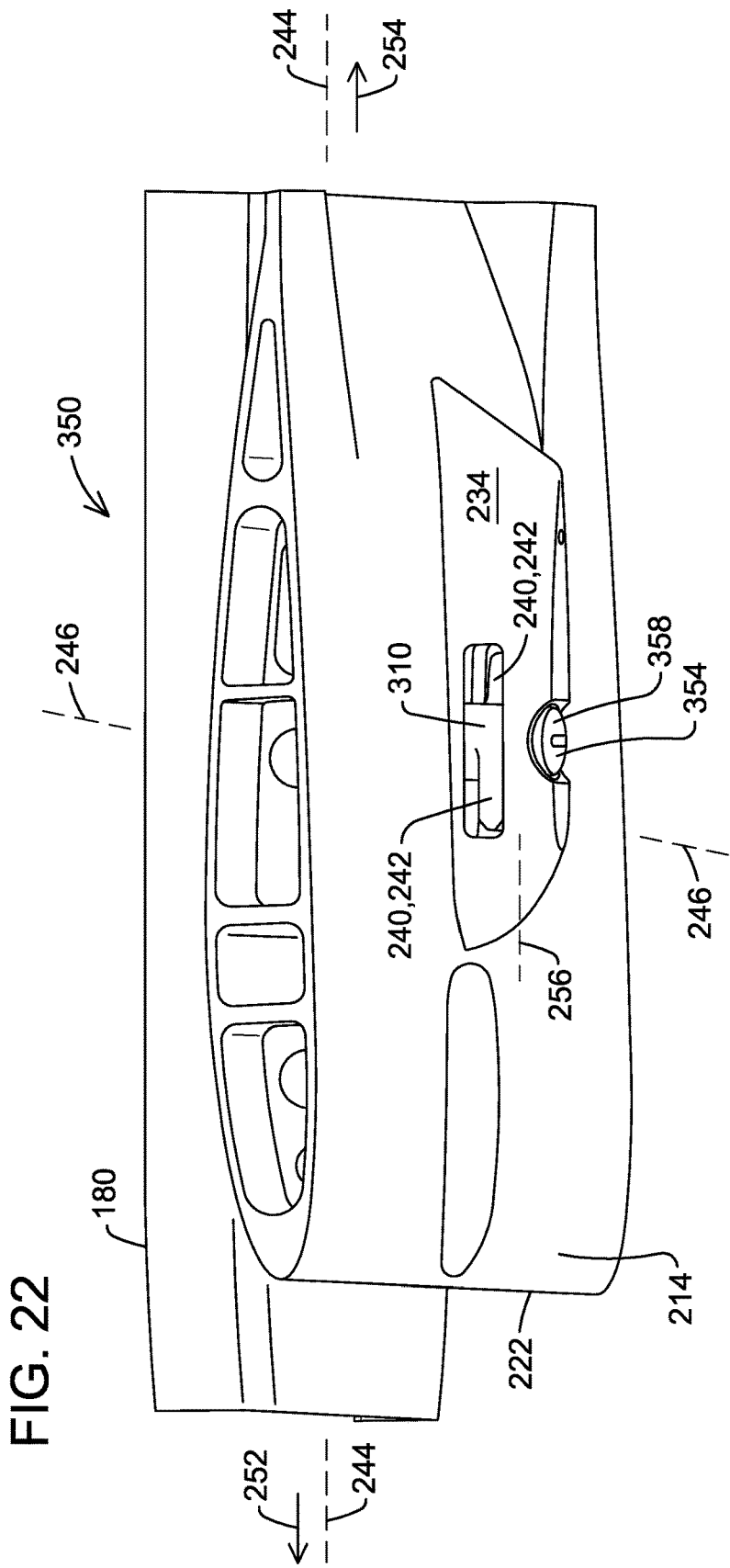
FIG. 22 illustrates a bottom perspective view of an example embodiment of pylon and an example embodiment of a column feature when the trifold wing is in the deployed position.

FIG. 22. shows the center wing section 214 in the deployed position 302. The pylon 234 rotates with the center wing section 214. When the center wing section 214 is in the deployed position 302, a long axis 256 of the pylon 234 is substantially aligned with the column feature 240 so that the column feature 240 is fully within the pylon 234, although being only partly within the pylon 234 is an option as well. This allows for a more aerodynamic profile. Oppositely, as can be seen in FIGS. 10-11, the column feature 240 is substantially misaligned (e.g. perpendicular) to the long axis 256 of the pylon 234 when the center wing section 214 (and trifold wing 200) are in the stowed position 250, which allows the column feature 240 to access and retain the tips 230, 232 of the panels 204, 206 when the panels are in the folded configuration 202.

In an example embodiment, a bottom fastener 354 is secured the pivot column 310 proximate the column feature 240. As can be seen in FIG. 23, a friction portion 356 of the pylon 234 is compressed between a head 358 of the fastener and a friction surface 360 at a bottom of the pivot column 310 and surrounding a recess 362 for the bottom fastener 354. Additional components may be disposed between the head 358 of the bottom fastener 354 and the friction surface 360, such as friction washer and/or spacers etc.

By adjusting a tightness of the bottom fastener 354, an amount of friction experienced by the friction portion 356 of the pylon 234 may be controlled. Controlling the amount of friction can, in turn, control a rate at which the center wing section 214 rotates under the bias of the coil spring 316. More friction will slow the deployment of the trifold wing 200, while less friction will speed the deployment. A proper rate of deployment will minimize a time to deployment while minimizing the forces experienced by the rotating and unfolding components FIG. 24 is a close-up of the port wing panel 204 the trifold wing 200 in the folded configuration 202. The wing joint 210 enables the folding and includes a wing joint coil spring 370 configured to constantly bias the port wing panel 204 toward the unfolded configuration. The wing panel locking arrangement 212 includes an interlocking geometry 372. In the example embodiment shown, the interlocking geometry 372 includes a panel lock recess 374 and a panel lock extension 376 that are separate from one another when the trifold wing 200 is in the folded configuration 202 as shown, but which nest together when the trifold wing 200 is in the unfolded configuration. The interlocking geometry 372 further includes a panel pin 378 biased to project into the panel lock recess 374, and a hasp 380 and panel pin feature 382 as part of the hasp 380.

Figure 25:
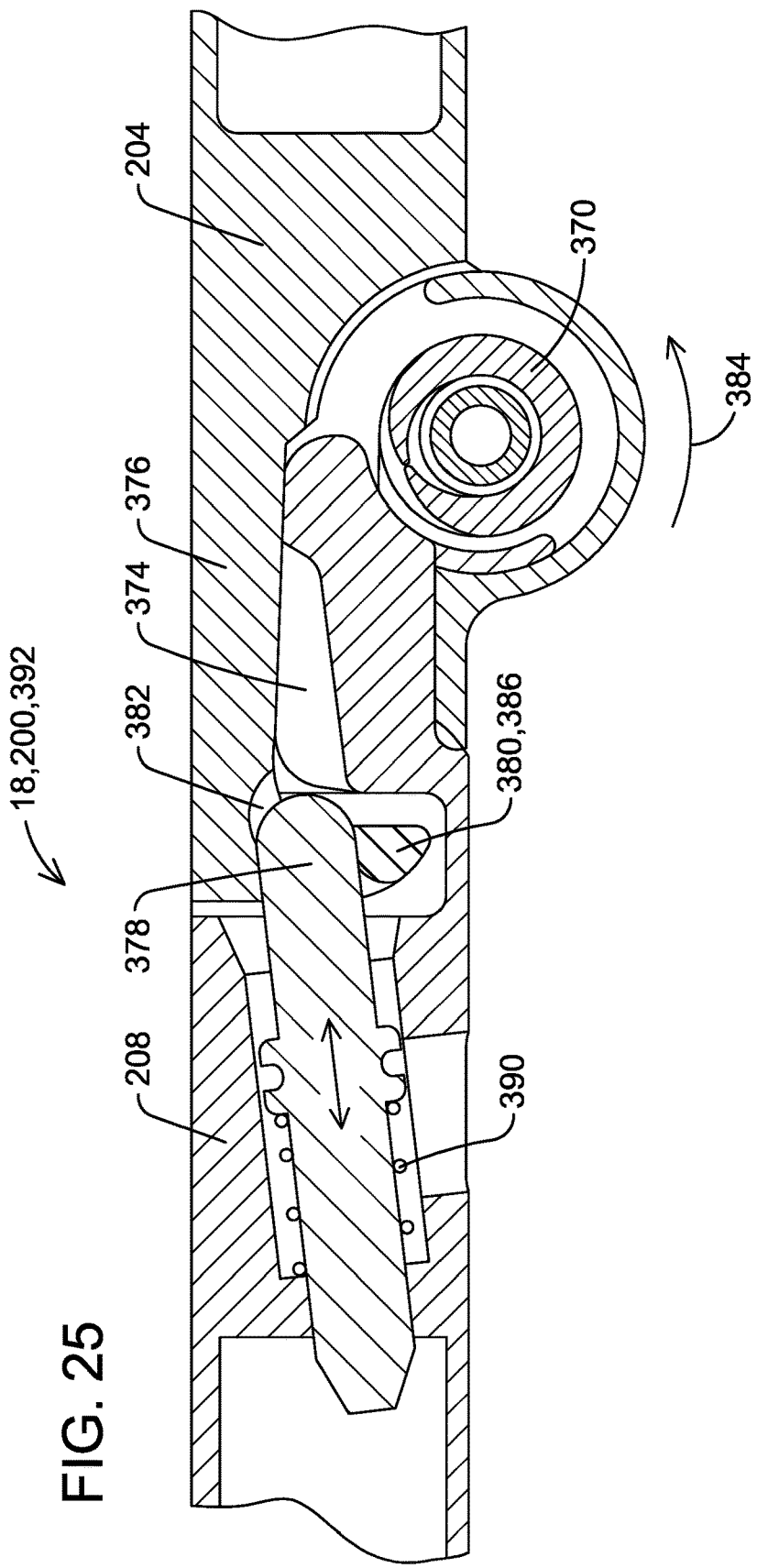
FIG. 25 illustrates a front view of the wing joint of FIG. 24 in an unfolded configuration.

As can be seen in FIG. 24 and the front cross section of FIG. 25, during deployment of the trifold wing 200, the column feature 240 releases from the port tip 230 of the port wing panel 204. This frees the port wing panel 204 to rotate in a counterclockwise direction 384 under the bias of the wing joint coil spring 370. This rotation continues until the panel lock extension 376 firmly seats in the panel lock recess 374, at which time the port wing panel 204 is in the unfolded configuration. As the panel lock extension 376 nears the panel lock recess 374, a curved surface 386 of the hasp 380 contacts the panel pin 378, and continued rotation of the port wing panel 204 in the counterclockwise direction 384 causes the curved surface 386 to push the panel pin 378 backward against a bias acting on the panel pin 378. Once the panel lock extension 376 is firmly seated, the panel pin feature 382 aligns with the panel pin 378 and the bias of a panel pin spring 390 pushes the panel pin feature 382. Once the panel pin 378 engages the panel pin feature 382, the port wing panel 204 is locked in the unfolded configuration 392.

An advantage of using the coil spring 316 to move the trifold wing 200 from the stowed position 250 to the deployed position 302 is the elimination of electrical motors and sensors, the elimination of the need for electromechanical coordination of the components, and a reduction in power draw from energy stores. In addition, eliminating these components reduces weight and reduces encroachment of the components into the fuselage 16, thereby freeing volume within the fuselage 16 that may be put to other uses. This arrangement is simple and mechanical, and therefore very reliable. The wing panel locking arrangement 212 overcomes buckling of the panels 204, 208 relative to the center wing panel 208 during flight. As such, this arrangement represents an improvement in the art.

Those skilled in the art will recognize improvements and modifications to the preferred embodiments of the disclosure. All such improvements and modifications are considered within the scope of the concepts disclosed herein and the claims that follow.

What is claimed is:

1. An apparatus, comprising:
    a fuselage body section configured to be secured to an aircraft fuselage;
    a pivot column protruding from the fuselage body section; and
    a center wing section, that rotates about the pivot column, configured to be secured to a center wing panel of a trifold wing;
    wherein the fuselage body section and the center wing section are configured to cooperate with each other to rotate the center wing section relative to the fuselage body section from a stowed position to a deployed position; and
    wherein the pivot column is rotationally fixed with respect to the fuselage and comprises a column feature positioned under the center wing panel that protrudes fore and aft relative to the fuselage, the column feature configured to engage with tip features of the trifold wing to hold the trifold wing in a folded configuration when the trifold wing is in the stowed position, and to disengage from the tip features as the trifold wing rotates away from the stowed position to the deployed position, thereby freeing the trifold wing to unfold.

2. The apparatus of claim 1, further comprising the trifold wing comprising:
    the center wing panel comprising the center wing section;
    a port wing panel pivotally secured to a port end of the center wing panel and comprising a respective tip feature configured to engage the column feature, the port wing panel configured to fold under the center wing panel into the folded configuration; and
    a starboard wing panel pivotally secured to a starboard end of the center wing panel and comprising a respective tip feature configured to engage the column feature, the starboard wing panel configured to fold under the center wing panel into the folded configuration.

3. The apparatus of claim 1, wherein a longitudinal axis of the pivot column coincides with an axis of rotation of the center wing section.

4. The apparatus of claim 1, further comprising the center wing panel of the trifold wing comprising the center wing section, wherein the pivot column is configured to position the column feature below the center wing panel.

5. The apparatus of claim 4, wherein the center wing panel further comprises a pylon that moves with the center wing panel,
    wherein when in the stowed position the column feature protrudes from the pylon to hold the trifold wing in the folded configuration; and
    wherein in the deployed position the pylon encompasses the column feature therein.

6. The apparatus of claim 5, further comprising a pivot column bottom fastener secured to a lower end of the pivot column and configured to frictionally engage the pylon between the pivot column bottom fastener and the pivot column to control a rate of the rotation via friction.

7. The apparatus of claim 1, further comprising a resilient member configured to bias the center wing section toward the deployed position when the center wing section is in the stowed position.

8. The apparatus of claim 1, further comprising a joint arrangement configured to enable the rotation, the joint arrangement comprising:
    a fuselage cylindrical surface arranged on the fuselage body section; and
    a wing cylindrical surface arranged on the center wing section,
    wherein the fuselage cylindrical surface and wing cylindrical surfaces are nested.

9. The apparatus of claim 8, the joint arrangement further comprising:
    a circumferential ramp; and
    a tang configured to engage the circumferential ramp,
    wherein a cooperation of the tang and the circumferential ramp is configured to secure the center wing section to the fuselage body section and to permit limited rotation of the center wing section.

10. The apparatus of claim 9, the joint arrangement further comprising at least one of a stop and a locking pin, each configured to stop the rotation of the center wing section when the center wing section reaches the deployed position.

11. The apparatus of claim 2, further comprising wing panel locking arrangements, each locking arrangement configured to lock a respective panel to the center wing panel in an unfolded configuration, each wing panel locking arrangement comprising a movable pin secured to one of the center wing panel and the respective panel, and a hasp secured to the other of the respective panel and the center wing panel and configured to displace and then receive the movable pin as the respective panel moves to the unfolded configuration.

12. The apparatus of claim 2, comprising an aerial vehicle that comprises the fuselage body section, the pivot column, the center wing section, and the trifold wing.

13. An apparatus, comprising:
    a fuselage;
    a trifold wing comprising a port wing panel, a starboard wing panel, and a center wing panel there between;
    a joint arrangement configured to secure the center wing panel to the fuselage and permit the trifold wing to rotate from a stowed position to a deployed position;
    a pivot column secured to the fuselage and configured to secure the port and starboard wing panels of the trifold wing in a folded configuration when the trifold wing is in the stowed position and to release from the port and starboard wing panels as the trifold wing rotates away from the stowed position by way of the center wing panel rotating about the pivot column;
    wherein the pivot column is rotationally fixed with respect to the fuselage and comprises a column feature positioned under the center wing panel that protrudes fore and aft relative to the fuselage to engage respective panel features in the port and starboard wing panels when the trifold wing is in the folded configuration and the stowed position; and
    wherein as the trifold wing rotates away from the stowed position the column feature disengages from the panel features.

14. The apparatus of claim 13, the center wing panel further comprising a pylon from which the column feature protrudes when the center wing panel is in the stowed position, and within which the column feature resides when the center wing panel is in the deployed position.

15. The apparatus of claim 14, further comprising a pivot column bottom fastener secured to a lower end of the pivot column and configured to frictionally engage the pylon between the pivot column bottom fastener and the pivot column to control a rate of the rotation via friction.

16. The apparatus of claim 13, the joint arrangement further comprising:
 a fuselage cylindrical surface arranged on the fuselage;
 a wing cylindrical surface arranged on the center wing panel and nested with the fuselage cylindrical surface;
 a resilient member configured to bias the center wing panel toward the deployed position when the center wing panel is in the stowed position;
 a ramp formed in the fuselage; and
 a tang formed in the center wing panel,
 wherein the fuselage and wing cylindrical surfaces cooperate to enable the rotation; and
 wherein the ramp and the tang cooperate to secure the center wing panel to the fuselage and to limit the rotation.

17. The apparatus of claim 16, the joint arrangement further comprising a locking pin configured to engage and prevent rotation of the wing cylindrical surface relative to the fuselage cylindrical surface when the trifold wing reaches the deployed position.

18. The apparatus of claim 13, further comprising wing panel locking arrangements, each locking arrangement configured to lock a respective panel to the center wing panel in an unfolded configuration, each wing panel locking arrangement comprising a movable pin secured to one of the center wing panel and the respective panel, and a hasp secured to the other of the respective panel and the center wing panel and configured to displace and then receive the movable pin as the respective panel moves to the unfolded configuration.

19. The apparatus of claim 13, further comprising an aerial vehicle comprising the fuselage, the trifold wing, the joint arrangement, and the pivot column.

* * * * *